United States Patent [19]
Kawase et al.

[11] Patent Number: 5,684,659
[45] Date of Patent: Nov. 4, 1997

[54] MAGNETIC HEAD WITH COIL FORMED BY THIN FILM

[75] Inventors: Masahiro Kawase, Saitama-ken; Makoto Kameyama, Chiba-ken; Takahiro Nakagawa, Kanagawa-ken, all of Japan

[73] Assignee: Canon Kabushiki Kaisha, Tokyo, Japan

[21] Appl. No.: 551,460

[22] Filed: Nov. 1, 1995

[30] Foreign Application Priority Data

| Nov. 11, 1994 | [JP] | Japan | 6-277833 |
| Nov. 30, 1994 | [JP] | Japan | 6-296288 |
| Feb. 9, 1995 | [JP] | Japan | 7-021743 |

[51] Int. Cl.⁶ ............................ G11B 5/127
[52] U.S. Cl. ............................ 360/125
[58] Field of Search ................... 360/126, 125

[56] References Cited

U.S. PATENT DOCUMENTS

| 5,079,662 | 1/1992 | Kawakama et al. | 360/126 X |
| 5,296,992 | 3/1994 | Abe | 360/126 |
| 5,390,062 | 2/1995 | Matsuzawa et al. | 360/126 |
| 5,452,164 | 9/1995 | Cole et al. | 360/126 X |
| 5,545,256 | 8/1996 | Tolman | 360/126 |

Primary Examiner—John H. Wolff
Attorney, Agent, or Firm—Robin, Blecker Daley and Driscoll

[57] ABSTRACT

A magnetic head includes a first core having magnetic materials joined together through a magnetic gap, a second core having a magnetic material, and a coil formed with a thin film around a magnetic joining part between the first core and the second core.

28 Claims, 21 Drawing Sheets

F I G. 10(a)
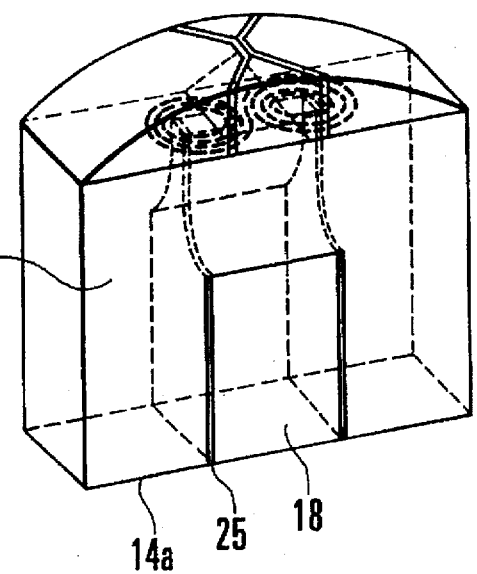
F I G. 10(b)
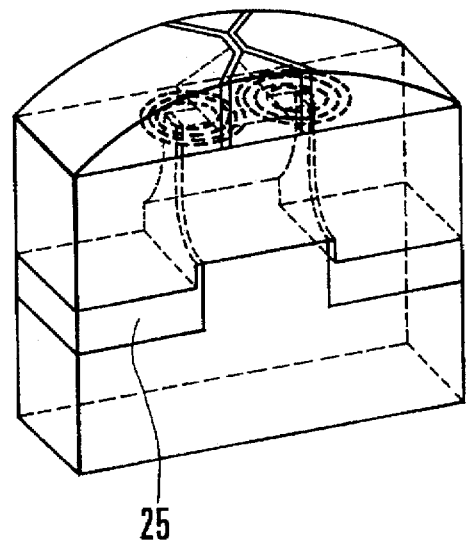
F I G. 10(c)
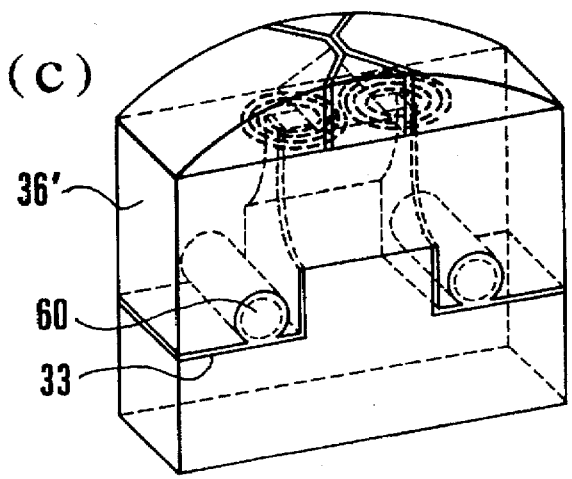

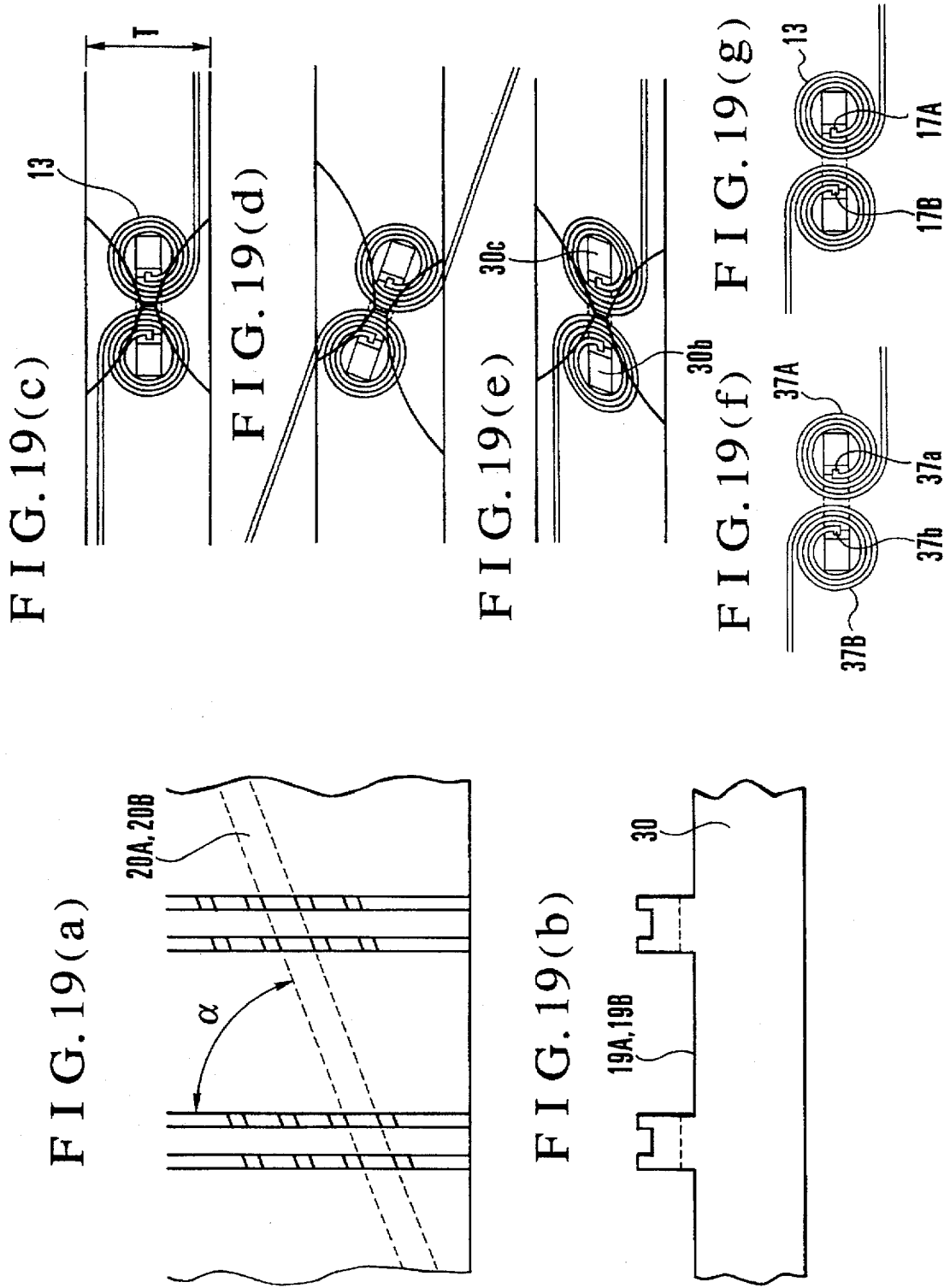

MAGNETIC HEAD WITH COIL FORMED BY THIN FILM

BACKGROUND OF THE INVENTION

1. Field of the Invention

This invention relates to a magnetic head and more particularly to a magnetic head advantageously adapted for a VTR.

2. Description of the Related Art

The advancement of technology for image encoding and magnetic recording has prompted a digitizing trend, which is now actually spreading into the field of consumer appliances. Magnetic recording by a digital VTR requires a high transfer rate, which necessitates a high-speed sliding capability of a tape over a head and a wider frequency band of signals. As a result, it has become an important theme to arrange a magnetic head of a digital VTR to have an improved output-to-noise characteristic (hereinafter referred to as C/N characteristic) for high frequencies.

To meet the requirements mentioned above, a magnetic head 500 has been developed as shown in FIG. 1 which shows the essential parts of the magnetic head 500. The head 500 shown in FIG. 1 is a thin film magnetic head (hereinafter referred to as TFH) which has been put to a practical use for hard disk drives. The TFH 500 is composed of a lower magnetic film 501, a thin film coil 502, an upper magnetic film 504 and a terminal 506 in a shape of being laminated through insulating films on a circuit board (not shown). A magnetic gap G is formed between the lower magnetic film 501 and the upper magnetic film 504. The TFH 500 has a good C/N characteristic, because it has a short magnetic path and the inductance thereof can be suppressed to a low value.

However, the TFH 500 does not allow one to secure a sufficient gap depth D against abrasion caused by a high-speed sliding movement of a recording medium. Even if a sufficient gap depth D can be secured, the TFH 500 has another problem with respect to magnetic saturation which takes place during recording due to the small sectional areas of the upper and lower magnetic films 501 and 504.

FIG. 2 shows a magnetic head 510 which is of the kind most popularly employed in the conventional analog VTR. The magnetic head 510 is generally called a MIG (metal in gap) head. Referring to FIG. 2, a metal film of high saturation magnetic flux density 512 is formed on a magnetic gap forming plane of each of a pair of core halves 511, which are set against each other through a magnetic gap G. The MIG head 510 permits the gap depth D to be formed in a sufficiently large size to preclude the problem of the magnetic saturation from taking place during recording. However, in a case where it is desired to arrange a magnetic head for a digital VTR to have a smaller magnetic path in an attempt to cope with high frequency signals, the size (X×Y) of a winding window 514 must be at least 0.25×0.25 mm², taking into consideration the diameter of a practical winding member. It is thus evidently difficult to have the magnetic head 510 arranged in about the same size as the TFH 500.

SUMMARY OF THE INVENTION

It is a principal object of this invention to provide a magnetic head which is arranged to solve the above-stated problem of the magnetic saturation taking place during recording and has a small magnetic path for an excellent C/N characteristic.

To attain this object, a magnetic head arranged as an embodiment of this invention includes a first core having magnetic materials joined together through a magnetic gap, a second core having a magnetic material, and a coil formed with a thin film around a magnetic joining part between the first core and the second core.

To attain the object from a different viewpoint, a magnetic head arranged as another embodiment of this invention includes a first core composed of a magnetic material having a magnetic gap, a second core having a magnetic material, the magnetic material of the second core being composed of a high-saturation magnetic-flux-density metal magnetic film formed in an approximately V-like sectional shape on a groove of a nonmagnetic substrate, and a thin film coil formed with a conductive metal film around a magnetic path connecting part between the magnetic film and the first core.

To attain the object from another different viewpoint, a magnetic head arranged as a further embodiment of this invention includes a first core having magnetic materials joined together through a magnetic gap, a second core having a magnetic material, the second core including two joining parts formed across a recessed part to be joined to the first core, coils discretely formed with a thin film respectively around the two joining parts, and a conductive film arranged in the recessed part to interconnect the discrete coils.

The above and other objects and features of this invention will become apparent from the following detailed description of embodiments thereof taken in conjunction with the accompanying drawings.

BRIEF DESCRIPTION OF THE DRAWINGS

FIGS. 10(a) to 10(c) respectively show examples of modification of the first embodiment.

FIGS. 19(a) and 19(b) show an example of modification of FIG. 18(e). FIGS. 19(c) to 19(e) show the details of the modification example. FIGS. 19(f) and 19(g) are top views relative to FIGS. 18(h) and 18(j), respectively.

DETAILED DESCRIPTION OF THE PREFERRED EMBODIMENTS

This invention is described in detail through its embodiments below with reference to the drawings.
(First Embodiment)

Figure 1:
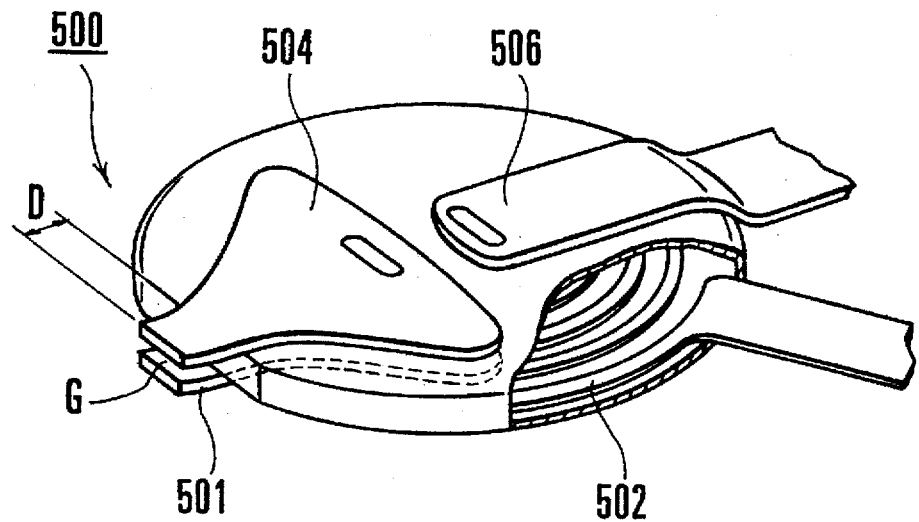
FIG. 1 is an oblique view showing by way of example the arrangement of the conventional magnetic head.
Figure 2:
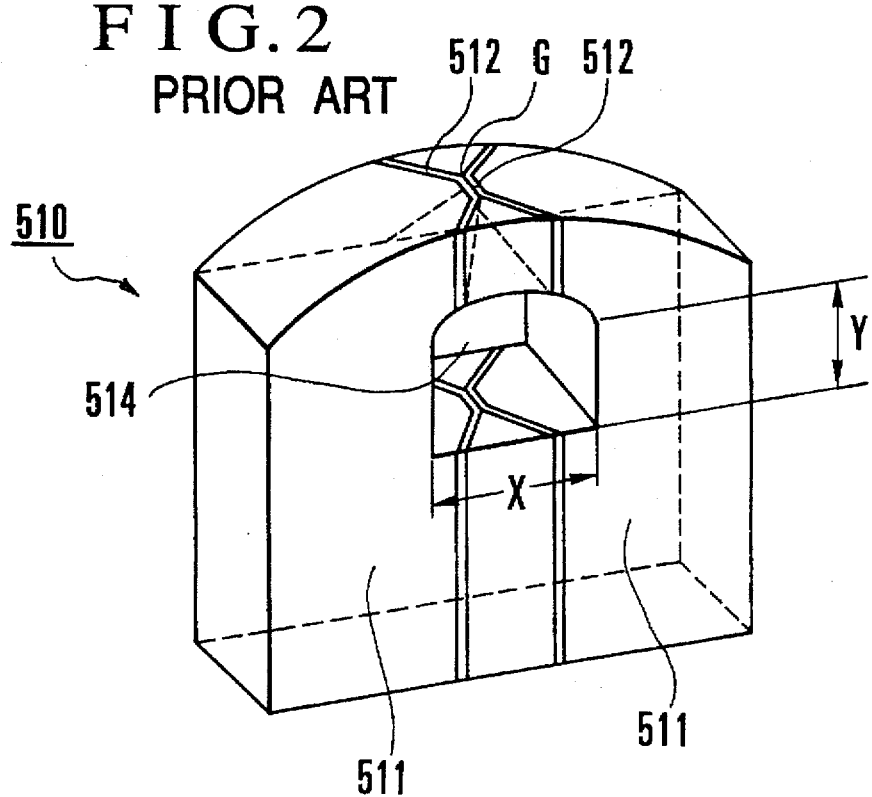
FIG. 2 is an oblique view showing another example of arrangement of the conventional magnetic head.
Figure 3:
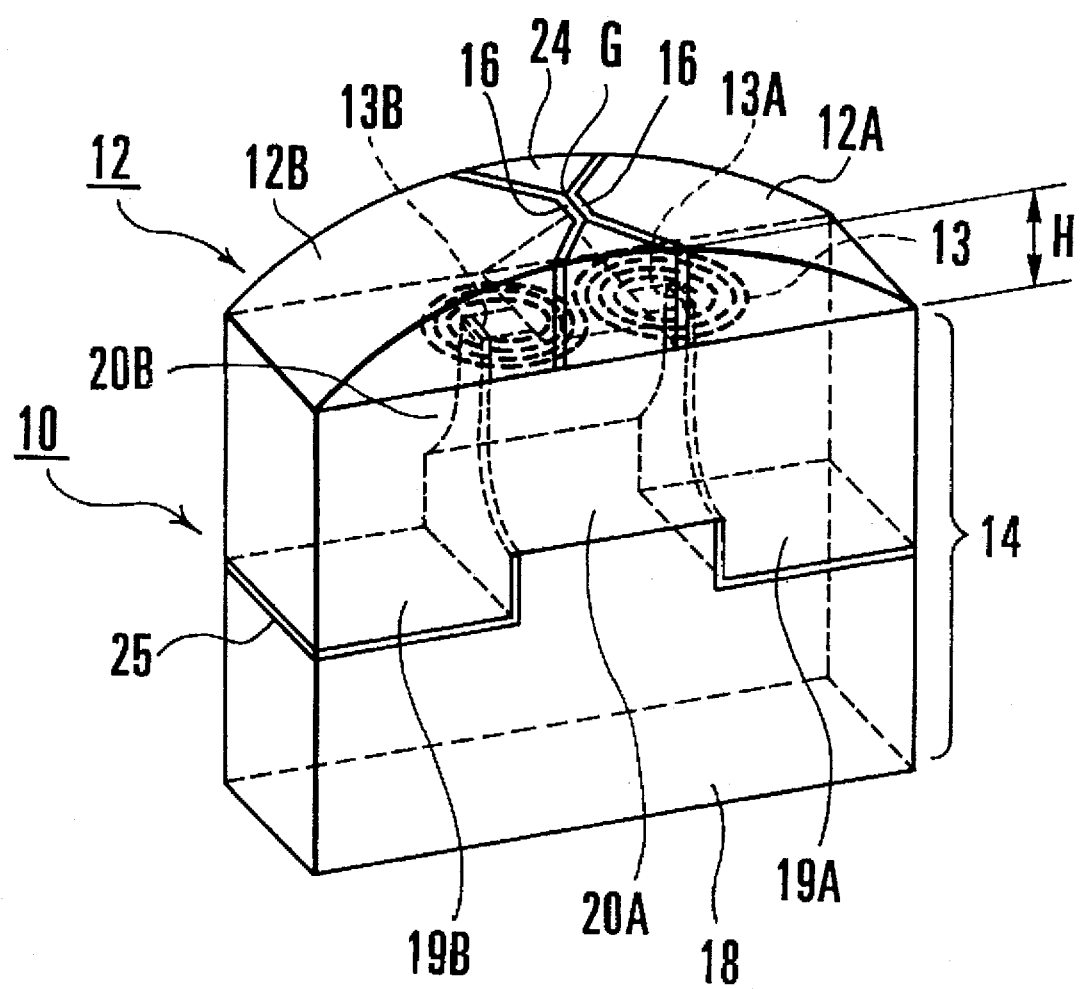
FIG. 3 is an oblique view showing a magnetic head arranged as a first embodiment this invention.
Figure 4A:
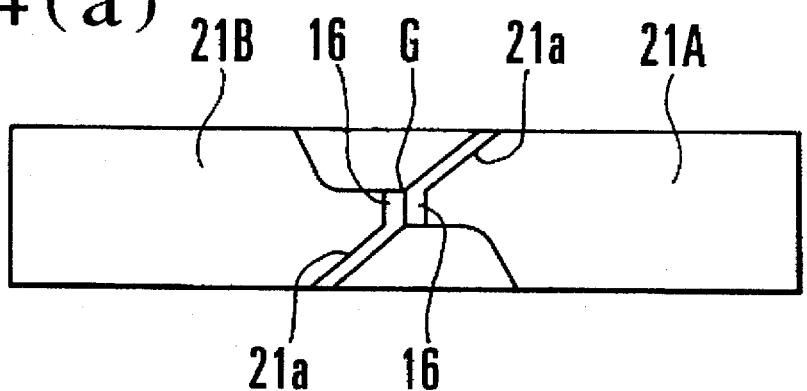
FIGS. 4(a), 4(b) and 4(c) shows examples of MIG type magnetic gap forming parts applicable to magnetic heads according to this invention.
Figure 4B:
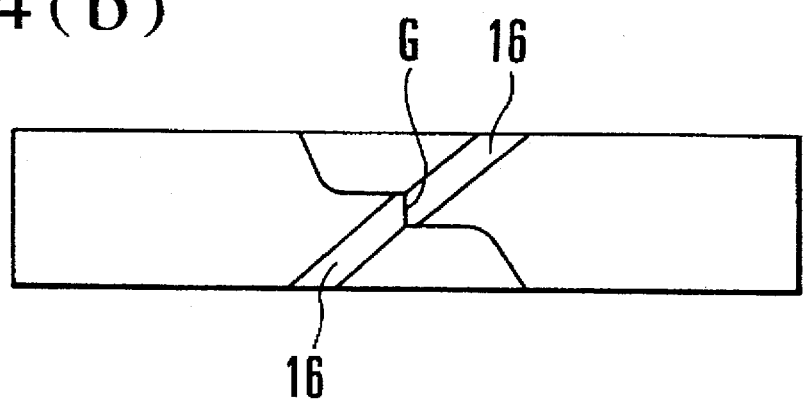
Figure 4C:
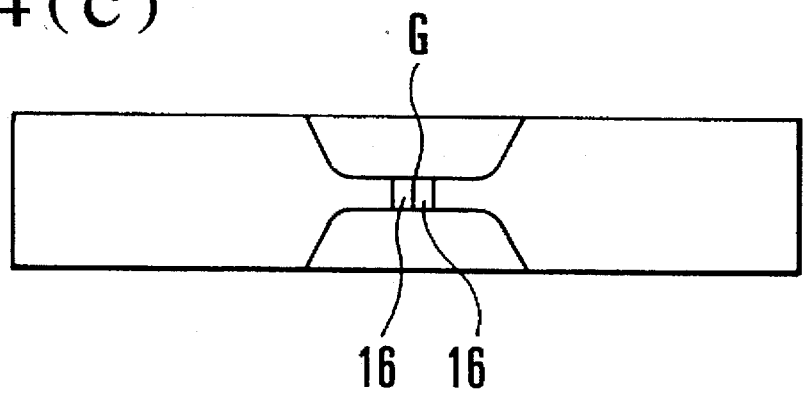

FIG. 3 shows in an oblique view a magnetic head 10 which is arranged as a first embodiment of this invention. In the magnetic head 10, a closed magnetic path is formed jointly by an upper core 12 having a sliding face in which a magnetic gap G is formed and a lower core 14 having a thin film coil 13 which is formed by a thin film forming method. The upper core 12 is of an MIG type structure composed of core halves 12A and 12B which are made of an Mn—Zn ferrite material, films 16 which are of a high saturation magnetic flux density metal alloy such as Sendust, Permalloy or the like (hereinafter referred to as magnetic films) and are applied respectively to the gap forming faces of the core halves 12A and 12B, and a glass part 24 which is arranged to join the core halves 12A and 12B with the magnetic films 16 opposed to each other. The magnetic gap G is formed between the magnetic films 16. If the thickness H of the upper core 12 is too thick, the magnetic path which is formed jointly by the upper and lower cores 12 and 14 becomes too long. Therefore, the thickness H of the upper core 12 is preferably to be limited to not greater than 0.2 mm. The track width of the upper core 12 can be limited in the same manner as in the case of the conventional MIG head. In the case of the first embodiment shown in FIG. 3, the magnetic head is of the so-called parallel MIG type in which the magnetic films are in parallel to the magnetic gap G, and the track width is restricted by a track restricting groove having a slanting face. In addition to this type, this invention is applicable also to a magnetic head of each of other MIG types shown by way of example in FIGS. 4(a), 4(b) and 4(c). The magnetic head shown in FIG. 4(a) is also of the parallel MIG type. In the case of FIG. 4(a), a magnetic film 16 is arranged to be continuing to one slanting face 21a formed in each of core halves 21A and 21B. The magnetic head shown in FIG. 4(b) is of a different MIG type in which magnetic films 16 are arranged to be not in parallel to a magnetic gap G. The magnetic head shown in FIG. 4(c) is of another parallel MIG type in which magnetic films 16 are formed only on the two sides of the magnetic gap G.

Referring again to FIG. 3, the lower core 14 is provided with two pairs of restricting grooves 19A, 19B, 20A and 20B for the purpose of shortening the magnetic path and reducing the sectional area of the magnetic path. These restricting grooves 19A, 19B, 20A and 20B are arranged to restrict the width of the magnetic path of a base 18 which is made of ferrite (a length in the sliding direction of a recording medium with respect to the magnetic head 10) and the thickness of the magnetic path (a length in a direction perpendicular to the recording medium sliding direction). The restricting grooves 19A, 19B, 20A and 20B will be described in detail later in the description of manufacturing processes. If a connection (joining) face of the lower core 14 which is formed to be joined to the upper core 12 for forming a magnetic path is arranged to be large, the length of the thin film coil 13 which has a large resistivity becomes longer to increase an amount of resistance. In addition to that, the sectional area of the magnetic path also increases to increase inductance. In view of this, the area of the connection face is required to be limited to not greater than $0.1 \times 0.1 = 1 \times 10^{-2}$ mm². If, conversely, the connection face is too small, the magnetic flux density increases to result in a larger adverse effect of magnetic saturation. To avoid the adverse effect, the connection area must be arranged to be at least $0.02 \times 0.02 = 4 \times 10^{-2}$ mm².

For drawing out the thin film coil 13 to the outside of the head 10, leader lines 25 which are made of a conductive film are provided within the restricting grooves 19A and 19B which restrict the width of the magnetic path of the lower core 14. The leader lines 25 are connected directly to the thin film coil 13 at coil connection points 13A and 13B.

The details of a process for connecting the thin film coil 13 to the leader lines 25 will be described in the description of manufacturing processes later herein. The connection is arranged to be automatically made in forming the thin film coil 13 on the lower core 14. By virtue of such an arrangement, the thin film coil 13 can be easily and simply drawn out to the outside of the head 10. The leader lines 25 from the thin film 13 are thus led to the side faces of the lower core 14. Therefore, with the restricting grooves 19A and 19B arranged in suitable shapes, the drawing-out process can be made from any relatively free part of the magnetic head 10.

The processes for the manufacture of the lower core 14 are next described, with reference to FIGS. 5(a) to 5(k), as follows.

Figure 5A:
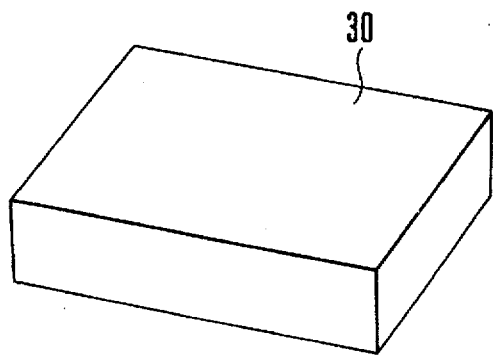
FIGS. 5(a) to 5(k) show processes to be carried out in manufacturing the lower core of the magnetic head shown in FIG. 3.
Figure 5B:
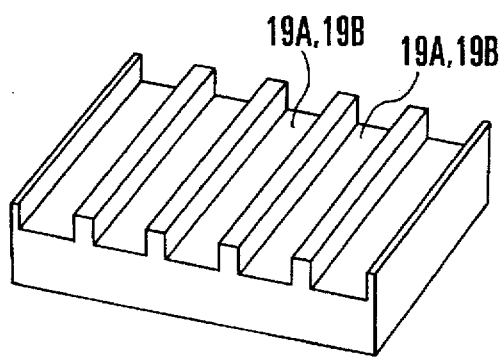

Referring to FIG. 5(a), the surface of a ferrite plate 30 which is a ferromagnetic oxide magnetic material is first polished. Next, a plurality of grooves 19A and 19B which restrict the magnetic path width of the lower core 14 are next formed in parallel, as shown in FIG. 5(b). In the machining process, the restricting grooves 19A and 19B are formed by grinding as a single groove.

Figure 5C:
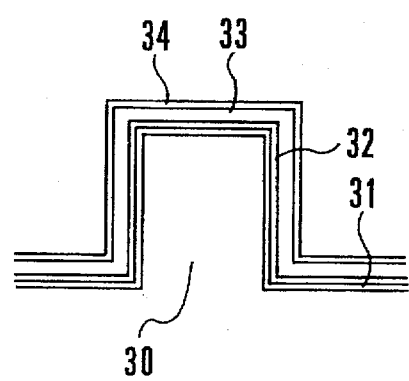

After that, as shown in FIG. 5(c) which shows essential parts in a sectional view, an insulating film 31 which is made of $SiO_2$, $Cr_2O_3$, $TiO_2$ or the like is formed by a vacuum film forming method or the like. A prime coat film 32 made of Cr or the like is then formed on the insulating film 31. This prime coat film 32 is formed for the purpose of adequately laminating a next layer of a conductive film 33. The conductive film 33 is made of Cu, Ni, Au or the like and is formed on the prime coat film 32 by plating. The conductive film 33 serves as the leader lines 25 (FIG. 3) of the thin film coil 13 when the head 10 is completed. The conductive film 33 is preferably arranged to have such a thickness that the resistance value of the conductive film 33 does not exceed 1Ω. After the plating process, in order to prevent the conductive film 33 from oxidizing, a protection film 34 is formed by applying $SiO_2$, $Cr_2O_3$, $TiO_2$ or the like to the surface of the conductive film 33 by a vacuum film forming method or the like. The conductive film 33 is formed by plating for the purpose of shortening a length of time required in film forming as the film must have a thickness which is 5 to 10 μm or thereabout. However, the plating process may be replaced with a sputtering process or a vacuum film forming process such as vacuum evaporation.

Figure 5D:
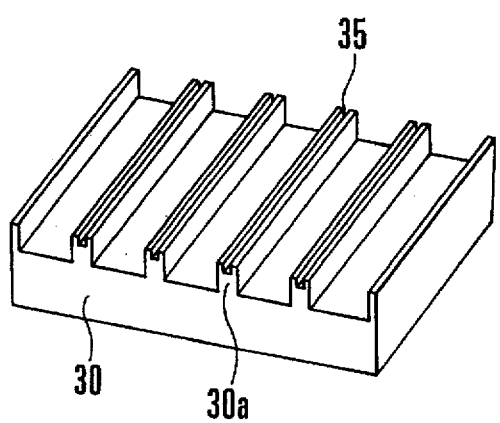

In the next process as shown in FIG. 5(d), winding grooves 35 for forming the thin film coil 13 are formed in parallel in the middle parts of the projections 30a of the plate 30 in which the magnetic path width restricting grooves. 19A and 19B are formed as mentioned above. The grooves 35 are machined by grinding. The depth of the grooves 35 is preferably set at a depth not exceeding 50 µm, because the magnetic path would become larger if the grooves 35 are too deep.

Figure 5E:
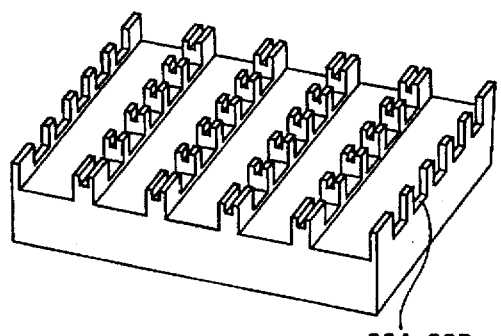

FIG. 5(e) shows the next process, by which a plurality of restricting grooves 20A and 20B are formed for restricting the thickness of the magnetic path. The grooves 20A and 20B are formed in parallel in such a way to orthogonally intersect the restricting grooves 19A and 19B with some difference in level from the grooves 19A and 19B, as shown in FIG. 5(e). In machining, these grooves 20A and 20B are formed by grinding them as one groove.

Figure 6A:
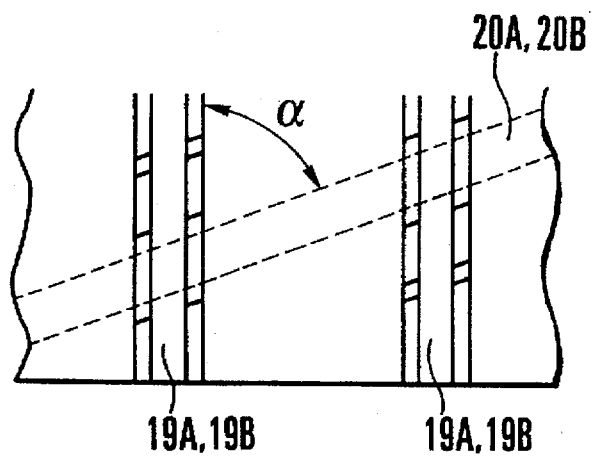
FIG. 6(a) shows by way of example a modification of what is shown in FIG. 5(e).
Figure 6B:
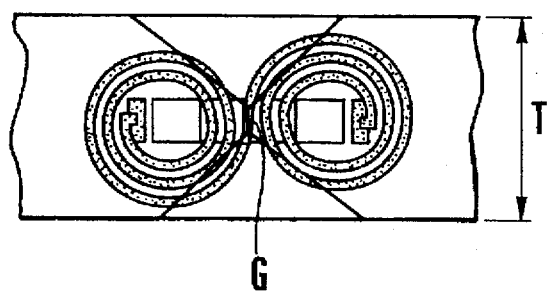
FIGS. 6(b) to 6(d) show the details of FIG. 6(a).
Figure 6C:
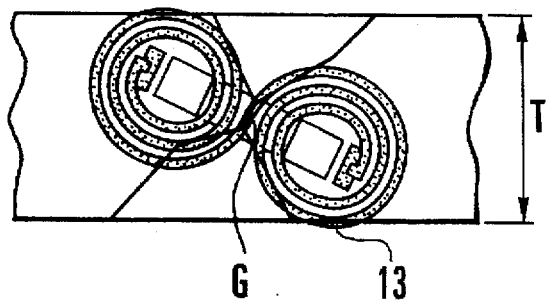
Figure 6D:
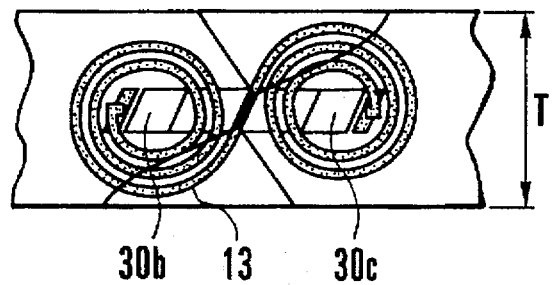

In a case where the magnetic gap G has an azimuth angle θ, the restricting grooves 20A and 20B are formed by slanting them as much as the azimuth angle θ unlike in the above-stated case. In other words, as shown in FIG. 6(a), the restricting grooves 20A and 20B are formed by slanting them as much as a degree of angle α (=90°−θ) with respect to the restricting grooves 19A and 19B. The reason for forming the restricting grooves 20A and 20B aslant as much as an azimuth angle θ in a case where the magnetic gap G has the azimuth angle θ is as follows. With the thickness of the core assumed to be T in a case where the magnetic gap G shown in FIG. 6(b) has no azimuth angle, if the magnetic gap G has a large azimuth angle as shown in FIG. 6(c), the thin film coil 13 might be cut in part when the core is cut at the core thickness T. In such an instance, it becomes impossible to obtain a desired characteristic or to completely insulate the thin film coil 13. In the event of a magnetic gap G having a large azimuth angle, therefore, the restricting grooves 20A and 20B are formed aslant as much as the azimuth angle θ. With the restricting grooves 20A and 20B formed aslant in this manner, the core can be cut so as to have a predetermined core thickness T without cutting the thin film coil 13, although the joining (connection) parts 30b and 30c are formed in a parallelogramic shape in that case, as shown in FIG. 6(d).

Figure 5F:
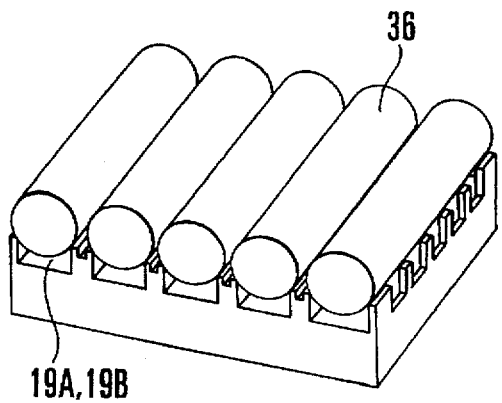

After that, as shown in FIG. 5(f), glass bars 36 are set on the machined grooves 19A and 19B and heated to bury the glass into all the machined grooves 19A, 19B, 20A and 20B. Considering a subsequent process of joining the upper core 12, the glass bars 36 to be used here are preferably of a high melting point glass material.

Figure 5G:
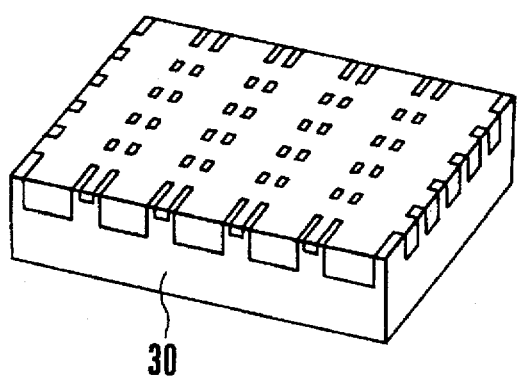

Next, as shown in FIG. 5(g), unnecessary parts of glass on the surface of the plate 30 are removed by surface grinding. As a result, two magnetic path connecting parts 30b and 30c and the conductive film 33 come to be exposed in a state as shown in FIG. 5(h).

Figure 5J:
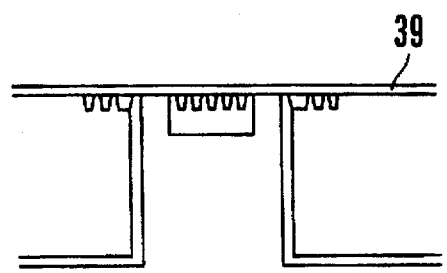
Figure 5H:
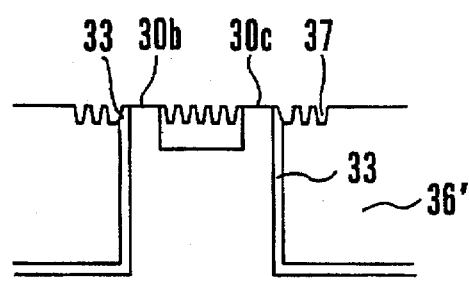
Figure 6E:
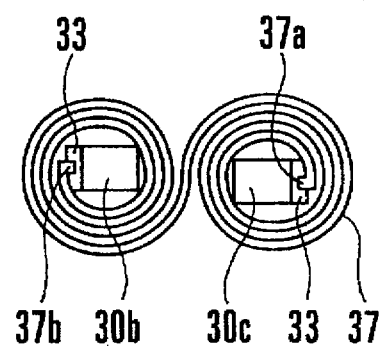
FIGS. 6(e) and 6(f) are top views relative to FIGS. 5(h) and 5(j), respectively.

To form the thin film coil 13 (see FIG. 3), a photoresist (not shown) is applied to the surface of the glass 36', as shown in FIGS. 5(h) and 6(e). After the pattern of the thin film coil 13 is exposed to light, the photoresist is removed. Further, the exposed part is subjected to ion milling to form a coil pattern recessed part 37 in a helical shape on the glass surface. The depth of the recessed part 37 is about 4 to 5 µm. The pattern of the thin film coil 13 is in a shape of balanced windings encompassing two magnetic path connecting parts 30b and 30c (magnetic path connecting parts of faces) which are exposed on the surface. The two ends 37a and 37b of the recessed part 37 are overlapping the exposed parts of the conductive film 33 adjoining the magnetic path connecting parts 30b and 30c. By virtue of this arrangement, the thin film coil 13 is automatically connected to the conductive film 33 when the thin film coil 13 is formed in the recessed part 37.

Figure 5K:
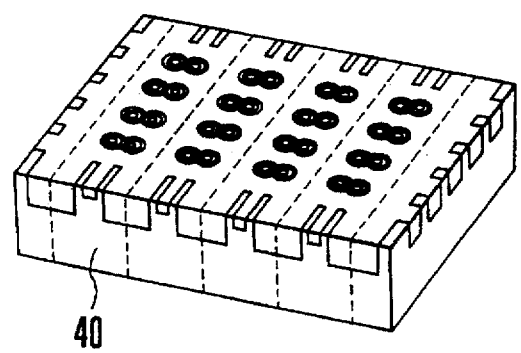
Figure 5I:
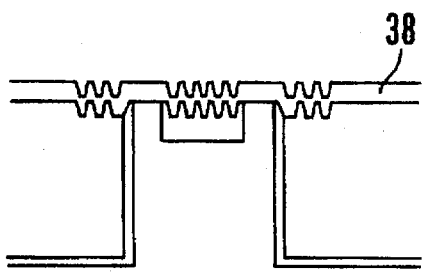

Next, as shown in FIG. 5(i), a film is formed by plating in such a way as to have a metal film 38 which excels in electric conductivity, such as Cu, Au or the like, buried in the helical recessed part 37 in thickness of about 6 µm. The film forming process may be carried out by a vacuum thin-film forming method, also in this case, instead of plating.

Figure 6F:
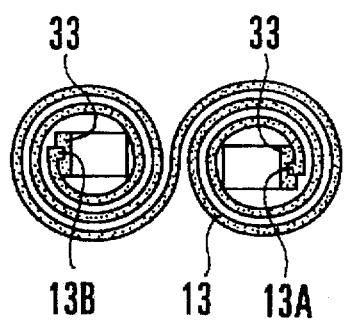

Then, as shown in FIGS. 5(j) and 6(f), the metal film 38 is removed by grinding. After the grinding, an insulating film 39 is formed with a material such as $SiO_2$, $Cr_2O_3$ or the like at a thickness not exceeding 1 µm. The insulating film 39 is formed at the thickness not exceeding 1 µm for the purpose of preventing the insulating film 39 from affecting the magnetic characteristic of the magnetic head 10 after the magnetic head 10 is formed by joining the upper and lower cores 12 and 14 together. The pattern of the thin film coil 13 is formed as shown in FIG. 6(f) by the sequence of manufacturing processes up to the process shown in FIG. 5(j). The terminals (leader lines 25) can be easily drawn out through the points 13A and 13B of the thin film coil 13 at which the coil 13 is connected to the conductive film 33.

Then, a block 40 for the lower core 14 is obtained by cutting the plate 30 along broken lines shown in FIG. 5(k).

Processes for manufacturing the upper core 12 are next described with reference to FIGS. 7(a) to 7(f). The manufacturing processes described here are fundamentally the same as processes for manufacturing the conventional MIG head. Compared with the conventional method, however, the number of products obtainable from a ferrite material of the same size increases, because it suffices to take out the sliding part according to the method of this invention.

Figure 7A:
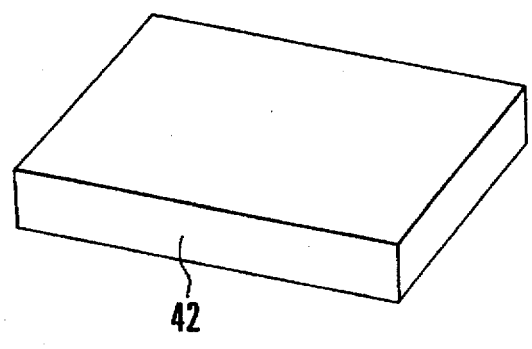
FIGS. 7(a) to 7(f) show processes to be carried out in manufacturing the upper core of the magnetic head shown in FIG. 3.
Figure 7B:
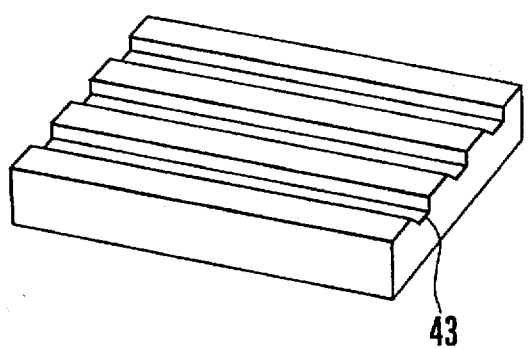
Figure 7C:
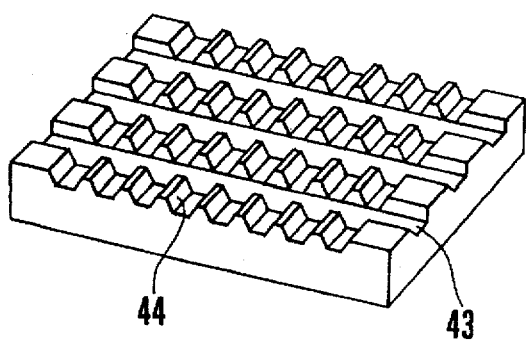

Referring to FIG. 7(a), a plate 42 made of ferrite is subjected to surface grinding in the first place. A plurality of restricting grooves 43 for restricting the gap depth are formed in the plate 42, in parallel to each other and in a trapezoid shape, as shown in FIG. 7(b). Then, as shown in FIG. 7(c), restricting grooves 44 for restricting the track width are formed in parallel on the surface of the plate 42, perpendicularly to the restricting grooves 43, and in a state of being equally spaced.

Figure 7D:
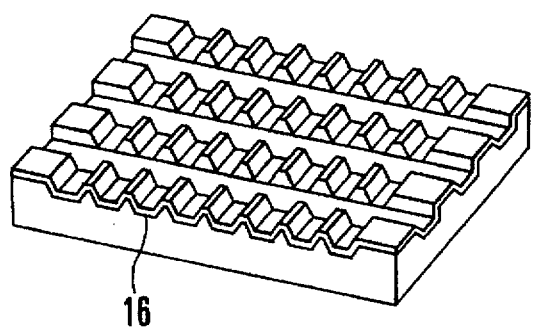
Figure 7E:
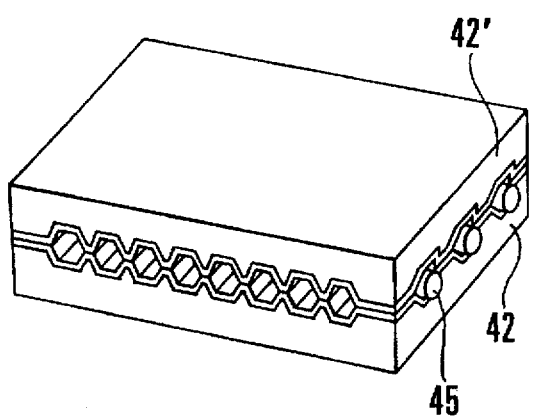
Figure 7F:
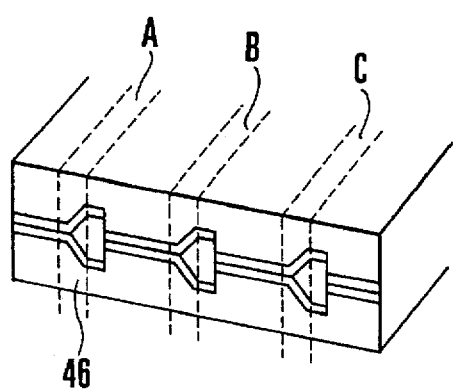

Next, referring to FIG. 7(d), a prime coat film (not shown) which acts as a diffusion preventing film is formed on the surface of the plate 42 by a vacuum film forming method. After the prime coat film is applied, a magnetic film 16 is formed with a material such as Sendust or Permalloy. Referring to FIG. 7(e), a gap material such as $SiO_2$ or the like is applied to the surface of the plate 42. After the gap material, another plate 42' which is prepared in the same manner as described above is butted against the plate 42. The two plates 42 and 42' are joined together into one block by butt welding using glass bars 45. Then, as shown in FIG. 7(f), a block 46 for the upper core 12 is taken out by cutting the plate 42 along broken lines as shown at each of parts A, B and C.

The block 40 for the lower core 14 and the block 46 for the upper core 12 are thus obtained through the processes described above with reference to FIGS. 5(a) to 5(k), 6(a) to 6(f) and 7(a) to 7(f). The lower and upper core blocks 40 and 46 are processed further to obtain the magnetic head 10 as shown in FIGS. 8(a) and 8(b).

Figure 8A:
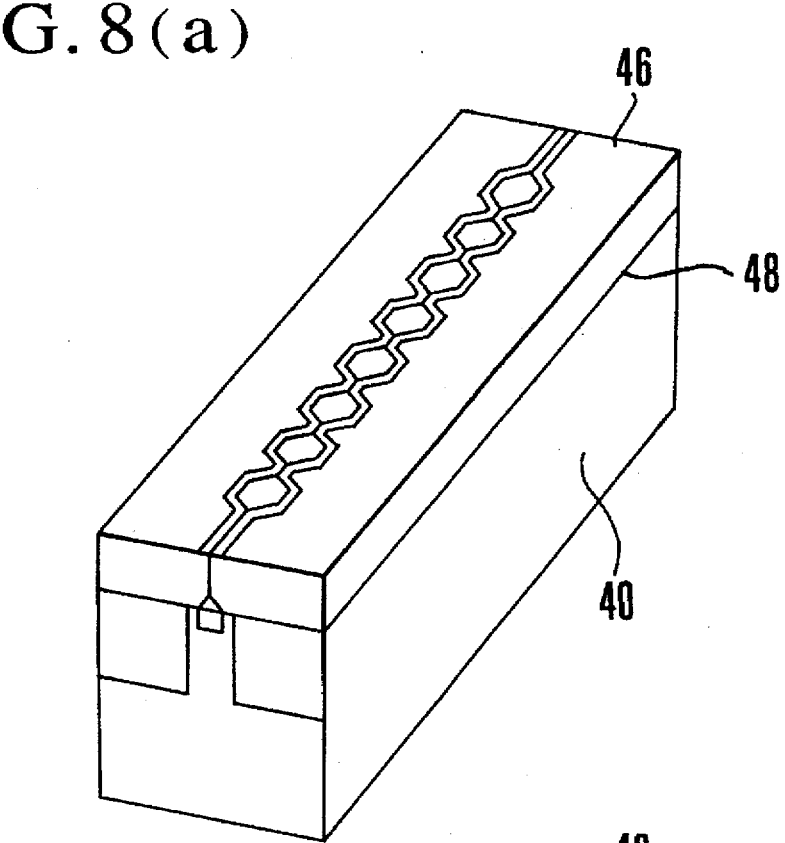
FIGS. 8(a) and 8(b) show a process of obtaining a magnetic head from the upper and lower cores.

In the process shown in FIG. 8(a), a film of low-melting point glass 48 is formed by a vacuum film forming process at the joining face of the lower core block 40. Then, after matching the positions of the two blocks 40 and 46 to each other, the blocks 40 and 46 are joined together by heating. Other effective joining methods include a resin adhesion method, if the resisting environment permits it, and a method by which a metal film is applied to the joining faces of both blocks and then they are joined together at a low temperature.

Figure 8B:
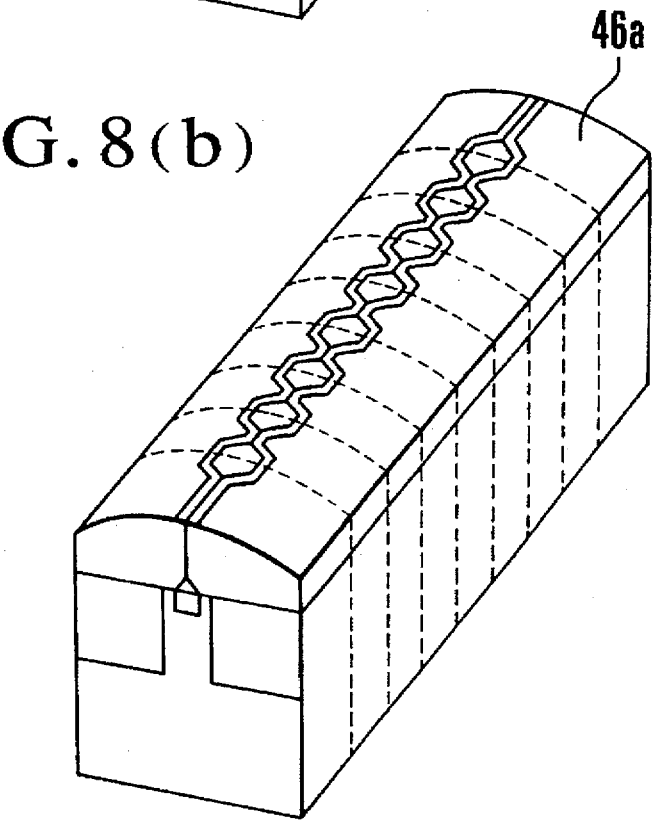

After completion of the process of FIG. 8(a), the process of FIG. 8(b) is performed. The sliding face side 46a of the upper core block 46 is subjected to cylindrical grinding. After the cylindrical grinding, the joined block is cut along broken lines as shown in FIG. 8(b) to obtain a magnetic head 10, which is as shown in FIG. 3.

Figure 11:
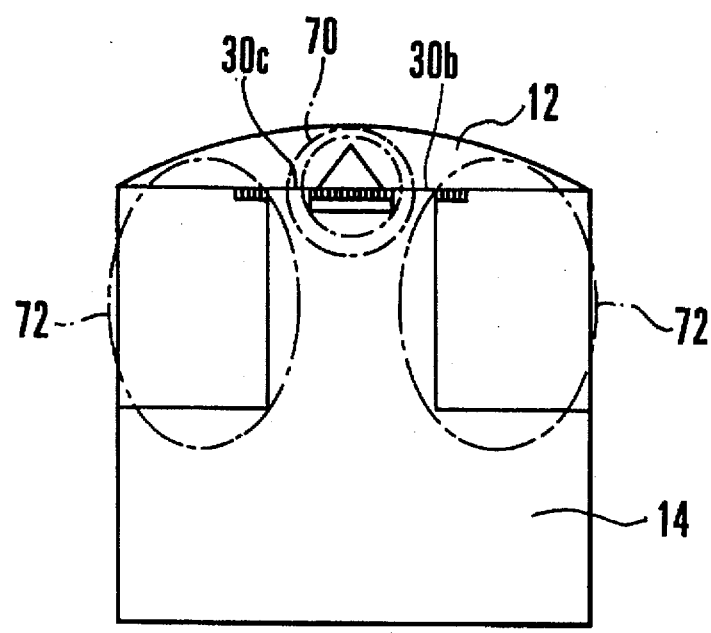
FIG. 11 shows a magnetic path formed in the magnetic head of the first embodiment.

FIG. 11 shows the magnetic path 70 of the magnetic head 10 which is formed as described above. As apparent from FIG. 11, the magnetic path formed in the upper core 12 and the lower core 14 which are interconnected through the magnetic path connecting parts 30b and 30c is very short. With the magnetic path reduced in this manner, the magnetic head can be arranged to have a good C/N characteristic.

Further, the magnetic head 10 has the upper and lower cores 12 and 14 arranged separately from each other and is provided with a coil formed by a thin film forming process on the joining face of the lower core 14 to the upper core 12. The arrangement effectively facilitates the process of connecting the leader lines to the coil. The arrangement, therefore, enhances the productivity of the magnetic head which has a good C/N characteristic by virtue of the compact magnetic path.

In the embodiment described above, the thin film coil 13 is formed on the glass part 36' of the lower core 14 for the purpose of accurately and easily positioning the thin film coil 13 in forming them there. However, this arrangement may be changed to form the thin film coil 13 on the side of the upper core 12 instead of the lower core 14 before the upper and lower coils 12 and 14 are joined together.

Figure 9:
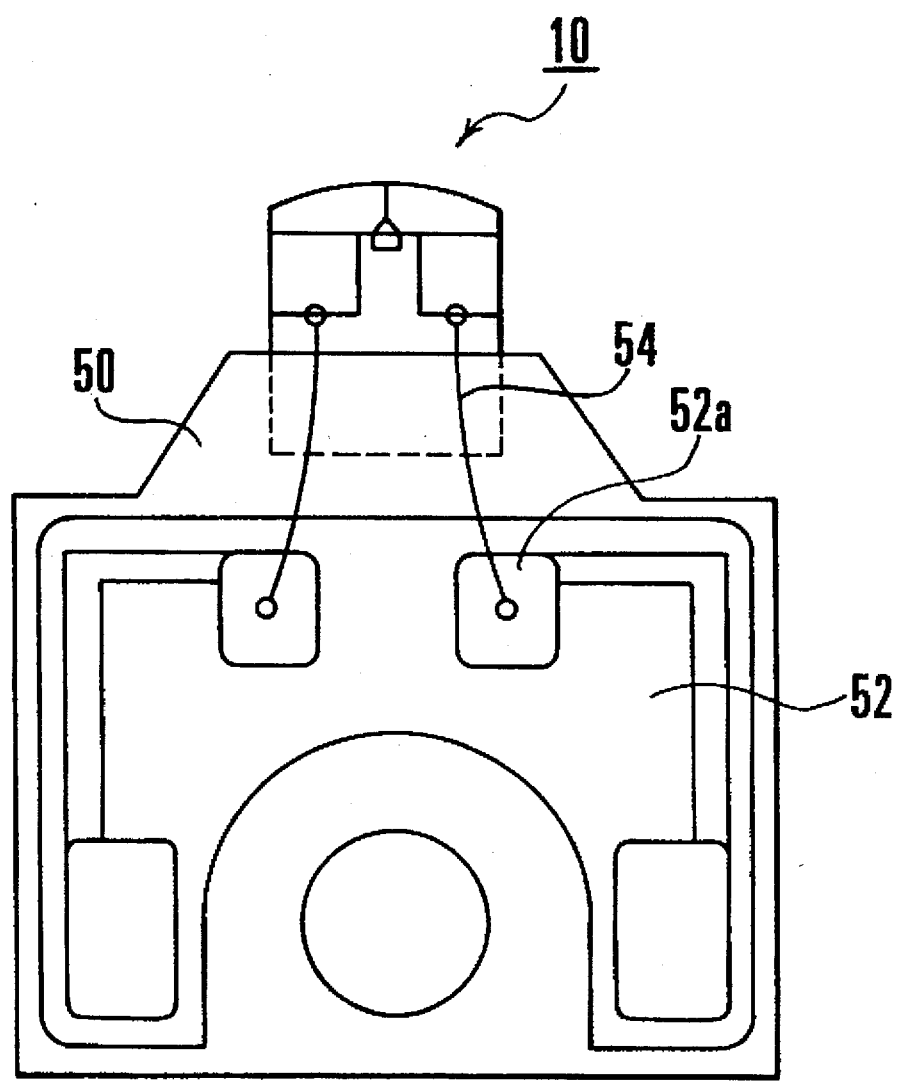
FIG. 9 shows a structural arrangement in which a magnetic head is connected to terminals formed in a printed circuit board.

The details of assembly processes for mounting the magnetic head 10 on a head base are omitted. As shown in FIG. 9, however, the terminals of the magnetic head 10 mounted on a head base 50 are pulled out to a printed circuit board 52. The terminal pulling-out process is carried out by connecting the leader lines 25 (conductive film) which are exposed on the side face of the magnetic head 10 to terminals 52a on the printed circuit board 52 by a wire bonding process using an Au wire or the like.

The characteristics of the magnetic head 10 which is obtained in the manner described above are compared with those of the conventional MIG type magnetic head mentioned in the foregoing description of the prior art. The results of the comparison are as shown in Table 1 below. The mechanical characteristics of these heads are obtained by setting the track width at 14 μm, the gap width at 0.2 μm and the gap depth at 12 μm. "Sendust" is used for both the magnetic films 16 and 512 of the heads. Outputs are measured by using a vapor evaporation tape of a coercive force of 1600 [Oe] as a recording medium. The relative speed of the recording medium is set at 10.2 [m/s] and the frequency at 21 [MHz].

TABLE 1

|  | inductance (20 MHz) | number of turns | DC resistance | 21 MHz C/N |
| --- | --- | --- | --- | --- |
| Prior art head: | 0.48 μH | 14 T | 0.9 Ω | 52.0 dB |
| Embodiment: | 0.43 μH | 20 T | 5.5 Ω | 54.5 dB |

For obtaining about the same inductance of 0.45 μH, the number of turns of the embodiment can be increased by 6 turns from the 14 turns of the conventional magnetic head. The embodiment thus evidently has a lower inductance. Although the DC resistance increases due to the use of the thin film coil, this increase causes almost no adverse effect and the C/N characteristic is improved by 2.5 dB. The results of comparison clearly indicate the advantage of the use of the thin film coil and the reduction in size of the magnetic path in the lower core, as the sliding parts of the two are of the same structural arrangement.

The details of the arrangement of the first embodiment described above can be changed as shown in FIGS. 10(a), 10(b) and 10(c). In the arrangement shown in FIG. 10(a), the shape of the base 18 of the lower core 14 of the first embodiment is changed from an inverse T shape as shown in FIG. 3 to an I shape which has the same width as the width of the magnetic path and extends to its lower end without changing the width. By virtue of this shape, the leader parts 25 of the thin film coil 13 can be exposed on a bottom face 14a of the lower core 14.

The thickness of the leader parts 25 of the thin film coil 13 can be increased as shown in FIG. 10(b). In the case of FIG. 10(c), conductive metal wires 60 or the like are brought into contact with the conductive films 33 (leader parts 25) by burying them in a glass part 36', so that the terminals can be easily pulled out.

Figure 12:
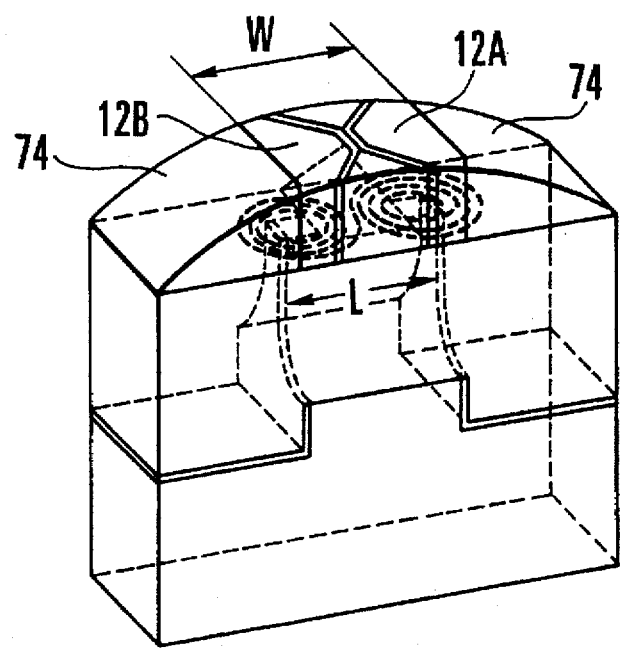
FIG. 12 shows another example of modification of the first embodiment.

FIGS. 11 shows a magnetic path 70 obtained by the arrangement of the embodiment described. As apparent from FIG. 11, the magnetic path 70 which is formed in the upper and lower cores 12 and 14 through the magnetic path connecting parts 30b and 30c is very short. Therefore, the magnetic head can be arranged to have a good C/N characteristic by virtue of the short magnetic path. In a case where leakage magnetic fluxes 72 might come around to increase inductance or to lower reproduction efficiency, such a problem can be solved by arranging the magnetic head as shown in FIG. 12. In the case of FIG. 12, a length W obtained in the upper core 12 with the core halves 12A and 12B joined together is arranged to be about the same as the width L of the magnetic path obtained in the lower core 14. In this case, ceramic parts 74 which is made of a nonmagnetic material are preferably cemented to the two end parts of the core halves 12A and 12B in the direction of sliding over a recording medium. The ceramic parts 74 are preferably made of ceramic of an $Al_2O_3$, $TiO_2$ or Ca—Ti system. While the ceramic parts 74 are used in consideration of abrasion, glass may be used in place of the ceramic parts 74.

The first embodiment described above is arranged to make the magnetic path of the whole magnetic head 10 compact by reducing the length and the sectional area of the magnetic path. Further, since the lower core 14 (base 18) is made of a ferromagnetic oxide material such as Mn—Zn ferrite, the size of the magnetic path can be reduced by restricting the width and thickness of the magnetic path with the two orthogonally intersecting pairs of restricting grooves 19A, 19B, 20A and 20B. The reason for using ferrite for the base 18 lies in that this material gives latitude in machining to a desired shape and is suited for obtaining many pieces at a time.

The drawing-out work on the thin film coil 13 is facilitated by forming the conductive films 33 at the parts where the grooves 19A and 19B are formed to restrict the width of the magnetic path in the lower core 14, so that the conductive films 33 can be easily connected to the thin film coil 13 when the thin film coil 13 is formed. This is an advantage in respect of productivity. The conventional thin film head is composed of a plurality of layers, including a lower magnetic film, a thin film coil, terminals and an upper magnetic film, and thus even a thin film forming part alone necessitates many processes. In the case of the embodiment of this invention, on the other hand, the thin film coil 13 can be formed in a single layer as it is not necessary to form terminals. The embodiment of this invention thus evidently excels in productivity.

Further, with respect to the terminal taking-out work, the coil is connected to the terminals 52a on the printed circuit board 52 by utilizing the sectional face of the conductive films 33 which are exposed either on the side faces or on the bottom face of the lower core 14. However, the conductive films 33 can be taken out in any desired manner by suitably shaping the grooves 19A and 19B which are arranged to restrict the width of the magnetic path formed in the lower core 14.

As apparent from the description given above, the magnetic head which is the first embodiment of this invention is composed of the upper and lower cores. The coil formed by a thin film forming method is disposed around a magnetic joining part between the upper and lower cores. Therefore, the leader lines of the coil can be easily connected. The magnetic head thus can be arranged to have a compactly formed magnetic path for a good output-to-noise (C/N) characteristic. Besides, the arrangement of the magnetic head enhances productivity.

(Second Embodiment)

A magnetic head which is arranged also according to this invention as a second embodiment thereof differs from the first embodiment in respect of the arrangement of the lower core 14. In the second embodiment, parts having the same functions as those of the first embodiment are indicated by the same reference numerals and the details of them are omitted from the following description.

Figure 13:
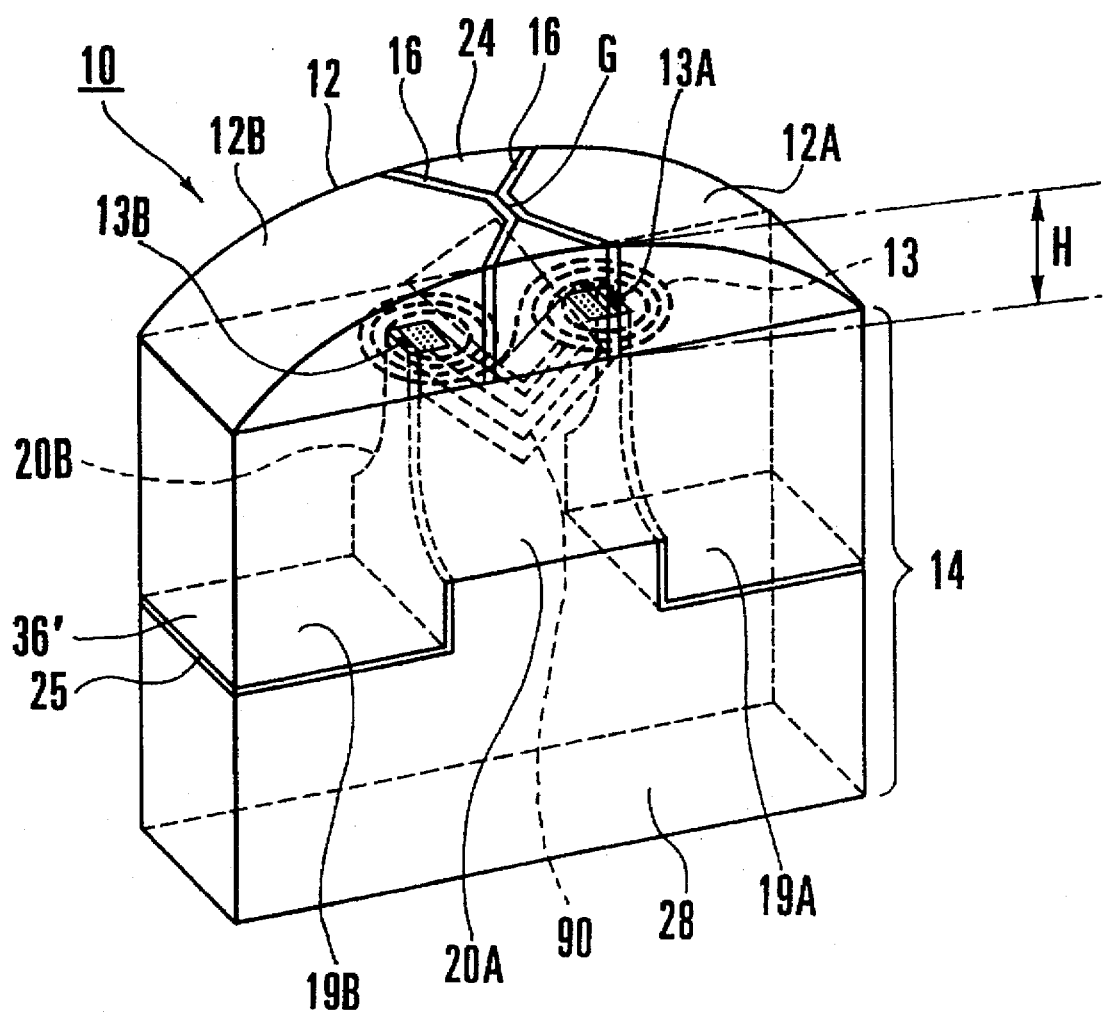
FIG. 13 is an oblique view showing a magnetic head arranged as a second embodiment of this invention.

FIG. 13 shows in an oblique view a magnetic head 10 which is the second embodiment of this invention. In the magnetic head 10, a closed magnetic path is formed by an upper core 12 and a lower core 14. The upper core 12 is provided with a sliding face which has a magnetic gap G formed therein. The lower core 14 is formed on a nonmagnetic substrate 28. In the lower core 14, a magnetic film 90 is formed to have a V sectional shape as the main body of the lower core 14. A thin film coil 13 which is made of a conductive metal film is formed around two magnetic path connecting parts 90b and 90c between the upper core 12 and the magnetic film 90 in such a way as to encompass the closed magnetic path. The parts 90b and 90c are as shown in FIGS. 14(j) and 14(k).

The arrangement of the second embodiment is also applicable to the magnetic heads shown in FIGS. 4(a), 4(b) and 4(c) like in the case of the first embodiment.

Again referring to FIG. 13, to make the length of the magnetic path of the magnetic film 90 shorter and its sectional area smaller, two pairs of restricting grooves 19A, 19B, 20A and 20B are formed in the nonmagnetic substrate 28 in such a way as to restrict the width (length in the sliding direction of a recording medium with respect to the magnetic head 10) and the thickness (length in the direction of orthogonally intersecting the sliding direction of the medium) of the magnetic path of the magnetic film 90. The details of the restricting grooves 19A, 19B, 20A and 20B will become apparent from the description of manufacturing processes which will be given later herein. To form a magnetic path, two magnetic path connecting faces, i.e., the upper faces of the magnetic path connecting parts 90b and 90c shown in FIGS. 14(j) and 14(k), are formed for magnetic path connection with the upper core 12 on the magnetic film 90 which is the main body of the lower core 14. Like in the case of the first embodiment, if the area of each of the magnetic path connecting faces is increased, the thin film coil 13 which has a large specific resistance becomes longer to increase a resistive part. Then the sectional area of the magnetic path also increases to cause an increase in inductance. In view of this, the area of each of these magnetic path connecting faces must be arranged not to exceed $0.1 \times 0.1 = 1 \times 10^{-2}$ mm$^2$. If this area is too small, on the other hand, magnetic flux density increases to increase the adverse effect of magnetic saturation. To avoid the adverse effect, the area of each of the magnetic path connecting faces must be at least $0.02 \times 0.02 = 4 \times 10^{-4}$ mm$^2$.

A method for manufacturing the magnetic head 10 which is the second embodiment is described as follows. Processes for manufacturing the lower core 14 are first described with reference to FIGS. 14(a) to 14(o).

Figure 14A:
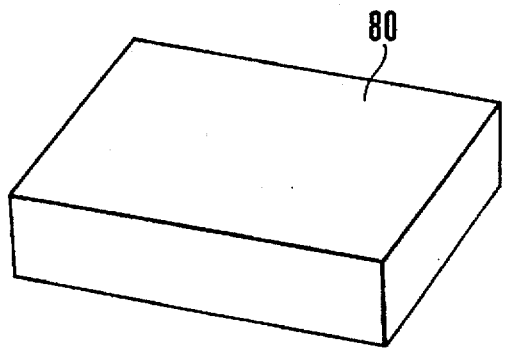
FIGS. 14(a) to 14(o) show processes to be carried out in manufacturing the lower core of the magnetic head shown in FIG. 13.

Referring to FIG. 14(a), the nonmagnetic substrate 80 which is made of titanic acid calcium (Ti—Ca system ceramic), glass oxide, titania (TiO$_2$), alumina (Al$_2$O$_3$) or the like is subjected to surface grinding.

Figure 14B:
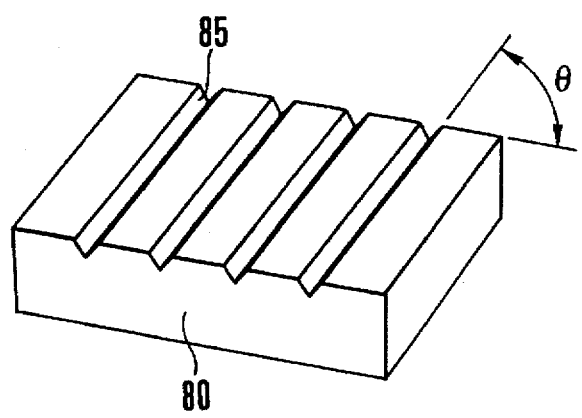

Next, as shown in FIG. 14(b), a plurality of film forming grooves 85 which are to be used for forming the magnetic film 90 as the main body of the lower core 14 are formed in parallel on the nonmagnetic substrate 80 by grinding its surface. Each of the film forming grooves 85 has a symmetrical V sectional shape. The slanting angle θ of the V sectional shape (with respect to the magnetic path connecting faces of the magnetic film 90 for connecting the upper core 12) relates to a space necessary in preparing the thin film coil and the angle of incidence of a magnetic film forming process which follows, and is preferably set within a range from 20° to 60°.

Figure 14C:
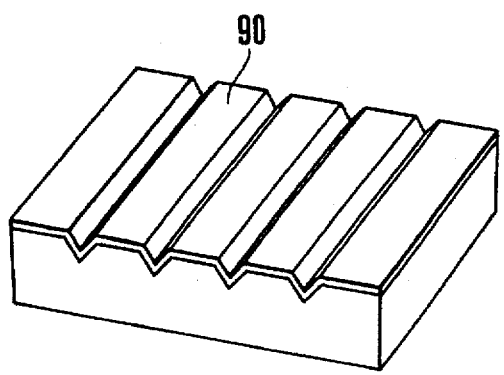
Figure 14D:
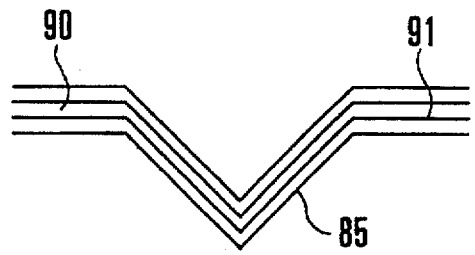

Then, a prime coat film of Cr, Ti, Pt or the like is formed to cover the whole surface of the nonmagnetic substrate 80 by a vacuum film forming process such as sputtering. After the prime coat film is formed, the magnetic film 90 is formed to a predetermined thickness with a high saturation magnetic flux density alloy such as Sendust or Permalloy, as shown in FIG. 14(c). Since an eddy current loss of the magnetic film 90 can be improved by laminating a plurality of layers, it is preferable that a plurality of layers of the magnetic film 90 are laminated on top of each other through an intermediate insulating film 91 which is made of SiO$_2$, Cr$_2$O$_3$, Al$_2$O$_3$ or the like, as shown in FIG. 14(c).

Figure 14E:
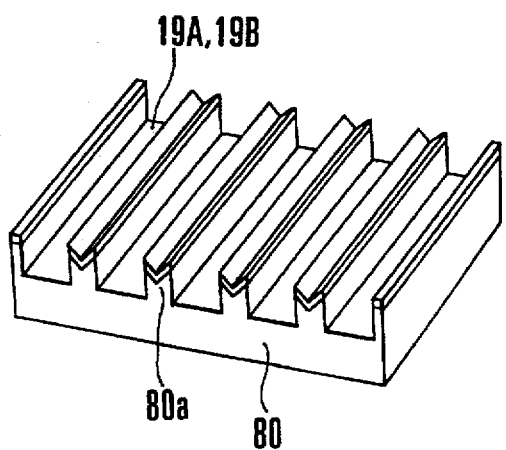

Next, as shown in FIG. 14(e), a plurality of restricting grooves 19A and 19B for restricting the width of the magnetic path of the lower core 14 are formed in parallel. In machining, however, the restricting grooves 19A and 19B are formed by grinding as one groove. Protruding parts 80a are formed by this process.

Figure 14F:
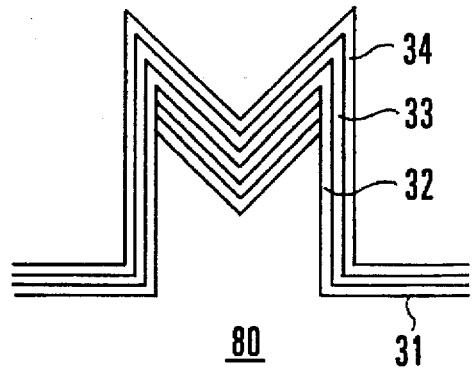

Then, as shown in FIG. 14(f) which is a sectional view showing essential parts, an insulating film 31 which is made of SiO$_2$, Cr$_2$O$_3$, TiO$_2$ or the like is formed by a vacuum film forming method on the surface of the nonmagnetic substrate 80. Then, a prime coat film 32 which is necessary for plating is formed on the insulating film 31 by a vacuum film forming method. Following that process, a conductive film 33 which is made of Cu, Ni, Au or the like is formed on the prime coat film 32 to a thickness of several μm. This conductive film 33 serves as leader lines 25 for the thin film coil 13 upon completion of the magnetic head 10 (see FIG. 13). The conductive film 33 is preferably arranged to have such a thickness that gives a resistance value not exceeding 1Ω. Further, to prevent the conductive film 33 from oxidizing after plating, a protection film 34 which is made of SiO$_2$, Cr$_2$O$_3$, TiO$_2$ or the like is formed on the surface of the conductive film 33 by a vacuum film forming method. In this process, the conductive film 33 is formed by plating, because the film 33 is required to have a thickness of 3 to 10 µm or thereabout and because it is desired to shorten the length of time necessary in forming the film. However, the conductive film 33 may be formed by sputtering or by a vacuum film forming method such as a vapor deposition process, instead of plating.

Figure 14G:
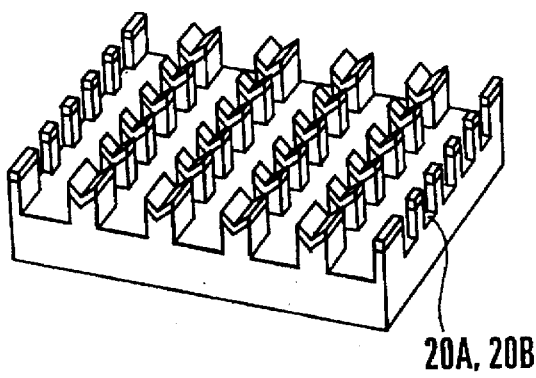

Next, as shown in FIG. 14(g), a plurality of restricting grooves 20A and 20B for restricting the thickness of the magnetic path are formed in parallel and in the direction of orthogonally intersecting the restricting grooves 19A and 19B. Further, it is possible to form the magnetic gap G at an azimuth angle θ by forming the restricting grooves 20A and 20B in such a way as to intersect the restricting grooves 19A and 19B at an angle of 90° plus θ to the restricting grooves 19A and 19B. In machining, however, the restricting grooves 20A and 20B are formed as one groove by grinding.

Figure 14H:
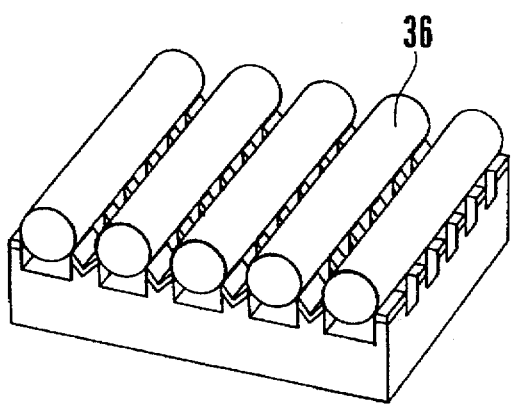

In the process of FIG. 14(h) after the process of FIG. 14(g), glass bars 36 are set on the machined grooves 19A and 19B. The glass bars 36 are then heated to cause the glass of them to be buried in all the machined grooves 19A, 19B, 20A and 20B by heating them. Considering a subsequent process of joining or bonding the upper core 12, it is preferable to use a high melting point glass material for the glass bars 36.

Figure 14I:
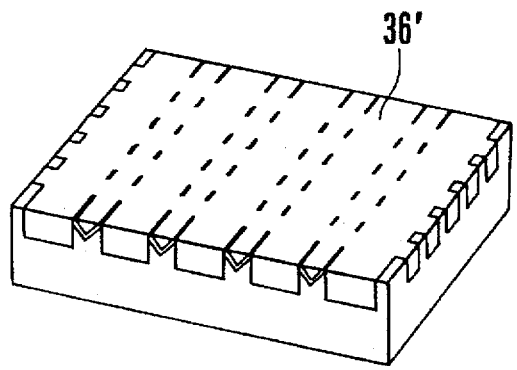
Figure 14J:
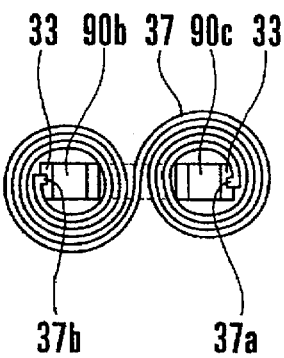
Figure 14K:
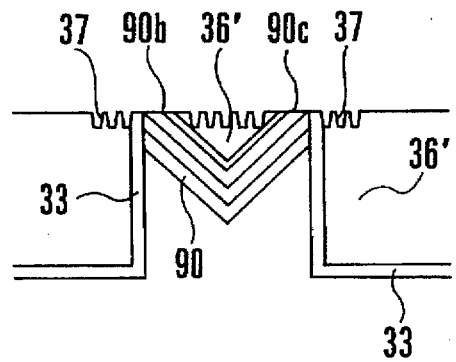

In the process of FIG. 14(i), unnecessary glass 36' on the surface of the nonmagnetic substrate 80 is removed by surface grinding. As a result, as shown in FIG. 14(k), the two magnetic path connecting parts 90b and 90c of the magnetic film 90 which are provided for magnetic connection with the upper core 12 and the conductive film 33 are exposed.

Referring now to FIG. 14(j), a photoresist (not shown) is applied to the surface of the glass 36' for the purpose of forming the thin film coil 13 after the process of FIG. 14(i). After the pattern of the thin film coil 13 is exposed to light, the photoresist part is removed. The exposed part is treated by ion milling to form recessed parts 37 in helical coil patterns on the surface of the glass 36' as shown in FIGS. 14(j) and 14(k). The recessed parts 37 have a depth of about 4 to 5 µm. The pattern of the thin film coil 13 is arranged in a balanced helical shape around each of the two magnetic path connecting parts 90b and 90c of the magnetic film 90 which are exposed. The two ends parts 37a and 37b of the recessed parts 37 are arranged to be overlapping the exposed parts of the conductive film 33 which are located adjacent to the magnetic path connecting parts 90b and 90c. This arrangement enables the thin film coil 13 to be connected automatically to the conductive film 33 when the thin film coil 13 is formed in the recessed parts 37.

Figure 14L:
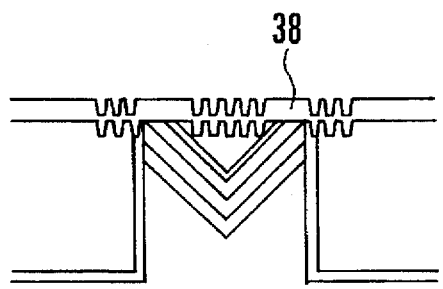

FIG. 14(l) shows a process by which a metal film 38 which excels in electric conductivity, such as Cu, Au or the like, is formed by plating to a thickness of about 6 µm in such a way as to have the metal film 38 buried in the helical recessed parts 37. In this case, the metal film 38 may be formed by a vacuum film forming method instead of plating.

Figure 14M:
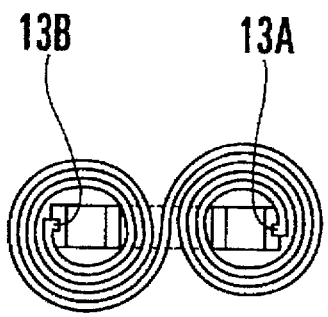
Figure 14N:
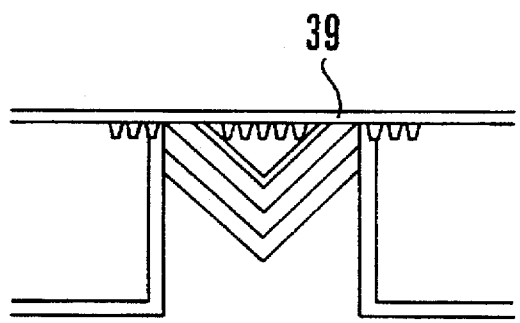

Referring to FIG. 14(n), an unnecessary part of the metal film 38 above the recessed parts 37 is removed by grinding. After that, an insulating film 39 which is made of $SiO_2$, $Cr_2O_3$ or the like is formed by a vacuum film forming method to have a thickness not exceeding 1 µm. The insulating film 39 is formed to a thickness not exceeding 1 µm for the purpose of avoiding any adverse effect of the insulating film 39 on the magnetic characteristic of the magnetic head 10 after the magnetic head 10 is formed by joining the upper core 12 to the lower core 14. A pattern of the thin film coil 13 is formed as shown in FIG. 14(m) by the processes described above. Then, the terminals, i.e., the leader lines 25, can be easily drawn out through coil connecting points 13A and 13B provided between the conductive film 33 and the thin film coil 13.

Figure 14O:
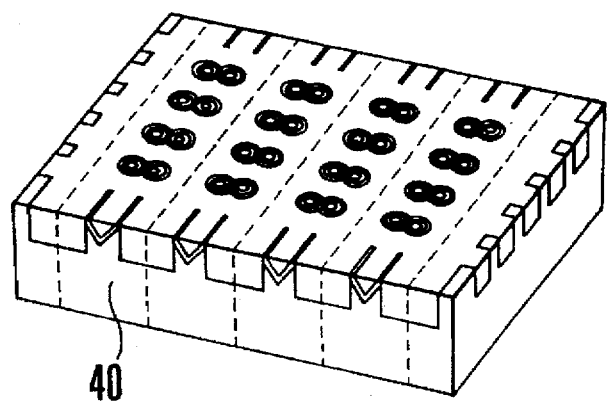

Referring to FIG. 14(o), blocks 40 for the lower core 14 are thus obtained by cutting the nonmagnetic substrate 80 along cutting lines indicated by broken lines.

After that, the block 46 for the upper core 12 which is obtained by the processes shown in FIGS. 7(a) to 7(f) and the block 40 for the lower core 14 are subjected to the machining process shown in FIGS. 8(a) and 8(b) to obtain the magnetic head 10 in the same manner as in the case of the first embodiment. The magnetic head 10 thus obtained as the second embodiment also has a good C/N characteristic with the magnetic path compactly arranged.

The characteristics of the magnetic head 10 which is obtained as described above are compared with those of the conventional MIG type magnetic head mentioned in the foregoing description of the prior art. Data obtained as the results of the comparison is as shown in Table 2 below. The mechanical characteristics of these heads are obtained by setting the track width at 14 µm, the gap width at 0.2 µm and the gap depth at 12 µm in the same manner as in the case of the first embodiment. "Sendust" is used for both the magnetic films 16, 90 and 512. Outputs are measured by using a vapor evaporation tape of a coercive force of 1600 [Oe] as a recording medium. The relative speed of the recording medium is set at 10.2 m/s and the frequency at 21 MHz.

TABLE 2

|  | inductance (20 MHz) | number of turns | DC resistance | 21 MHz C/N |
| --- | --- | --- | --- | --- |
| Prior art head: | 0.48 µH | 14 T | 0.9 Ω | 52.0 dB |
| Embodiment: | 0.42 µH | 20 T | 5.5 Ω | 54.8 dB |

For obtaining about the same inductance of 0.45 µH, the number of turns of the embodiment can be increased by 6 turns from the 14 turns of the conventional magnetic head. The embodiment thus evidently has a lower inductance. Although the DC resistance increases due to the use of the thin film coil, this increase causes almost no adverse effect and the C/N characteristic is improved by 2.8 dB. The results of comparison clearly indicate the advantage of the use of the thin film coil and the reduction in size of the magnetic path in the lower core, as the sliding parts of the two are of the same structural arrangement. The embodiment has about the same or more advantageous effect than the first embodiment.

Figure 15A:
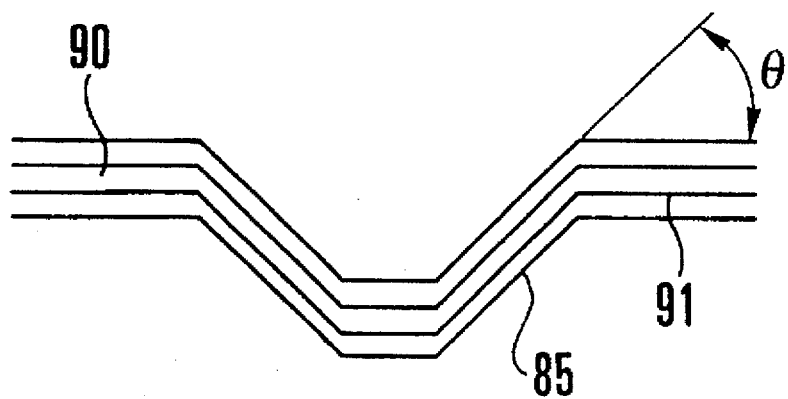
FIGS. 15(a) and 15(b) show an example of modification of the second embodiment.
Figure 15B:
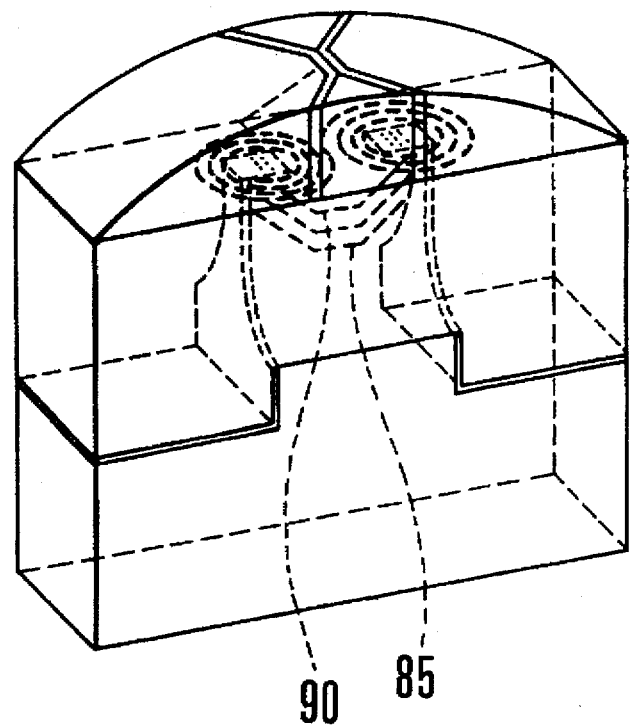

In the second embodiment, the sectional shape of the magnetic film 90 which represents the main body of the lower core, i.e., the sectional shape of the film forming groove 85 is a V shape. However, the sectional shape does not have to be in an exact V shape. The sectional shape of the magnetic film 90 (the film forming groove 85) may be flat or in a gently curving arcuate shape at its bottom, as shown in FIGS. 15(a) and 15(b), as long as its slanting angle θ is 20° to 60° within a distance range of 20 µm from the part where the magnetic film 90 is in contact with the magnetic path connecting face.

Further, like the first embodiment, the details of the arrangement of the second embodiment described above may be modified as shown in FIGS. 10(a), 10(b) and 10(c).

Figure 16:
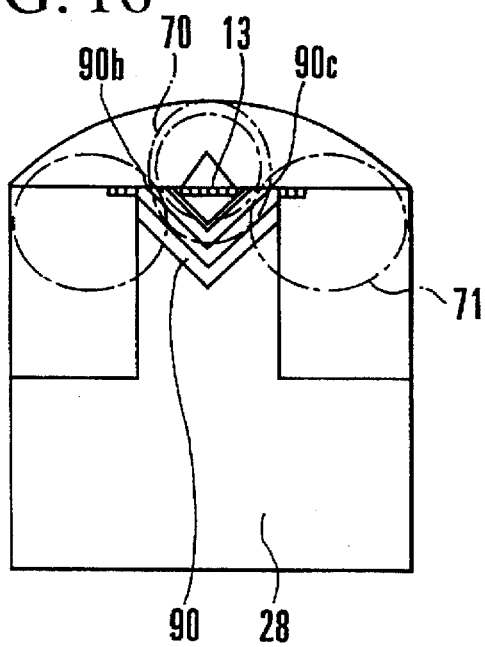
FIG. 16 shows the magnetic path of the magnetic head arranged as the second embodiment.

FIG. 16 shows a magnetic path formed by the arrangement of the second embodiment. As apparent from FIG. 16, the second embodiment has a very short magnetic path through which a main magnetic flux 70 flows in the upper core 12 and the magnetic film 90 (the main body of the lower core 14), which are connected to each other through the magnetic path connecting parts 90b and 90c. Therefore, the arrangement of the second embodiment gives a magnetic head of a good C/N characteristic by virtue of a compact magnetic path. In a case where it is considered to be possible that the inductance might be increased or the efficiency of reproduction might be lowered by the roundabout flow of a leakage magnetic flux indicated by a reference numeral 71 in FIG. 16, such a trouble can be avoided by adopting the arrangement shown in FIG. 12 in the same manner as in the case of the first embodiment.

According to the arrangement of the embodiment described above, the thin film coil 13 can be formed in a very small size by a thin film forming method. The magnetic film 90 which is the main body of the lower core 14 can be arranged to reduce the length and sectional area of the magnetic path. With the thickness of the upper core 12 arranged to be thin, therefore, the whole magnetic path of the magnetic head 10 can be very compactly arranged.

Further, a drawing-out work on the thin film coil 13 is facilitated by forming the leader lines 25 (the conductive films 33) at the parts where the grooves 19A and 19B are formed to restrict the width of the magnetic path in the lower core 14, so that the leader lines 25 (conductive films 33) can be easily connected to the thin film coil 13 when the thin film coil 13 is formed. This is an advantage in respect of productivity. The conventional thin film head is composed of a plurality of layers, including a lower magnetic film, a thin film coil, terminals and an upper magnetic film, and thus even a thin film forming part alone necessitates many processes. In the case of the embodiment of this invention, on the other hand, the thin film coil 13 can be formed in a single layer as it is not necessary to form terminals. The embodiment thus evidently excels in productivity.

(Third Embodiment)

A third embodiment of this invention differs from the first and second embodiments in that thin film coil parts 13a and 13b are interconnected by providing a conductive film 33 on the inner side of a winding groove 15. Elements of the third embodiment which are arranged to have the same functions as those of the first and second embodiments are indicated by the same reference numerals, and their details are omitted from the following description.

Further, the modifications which are applicable to the first and second embodiments as described in the foregoing also apply to the third embodiment.

Figure 17:
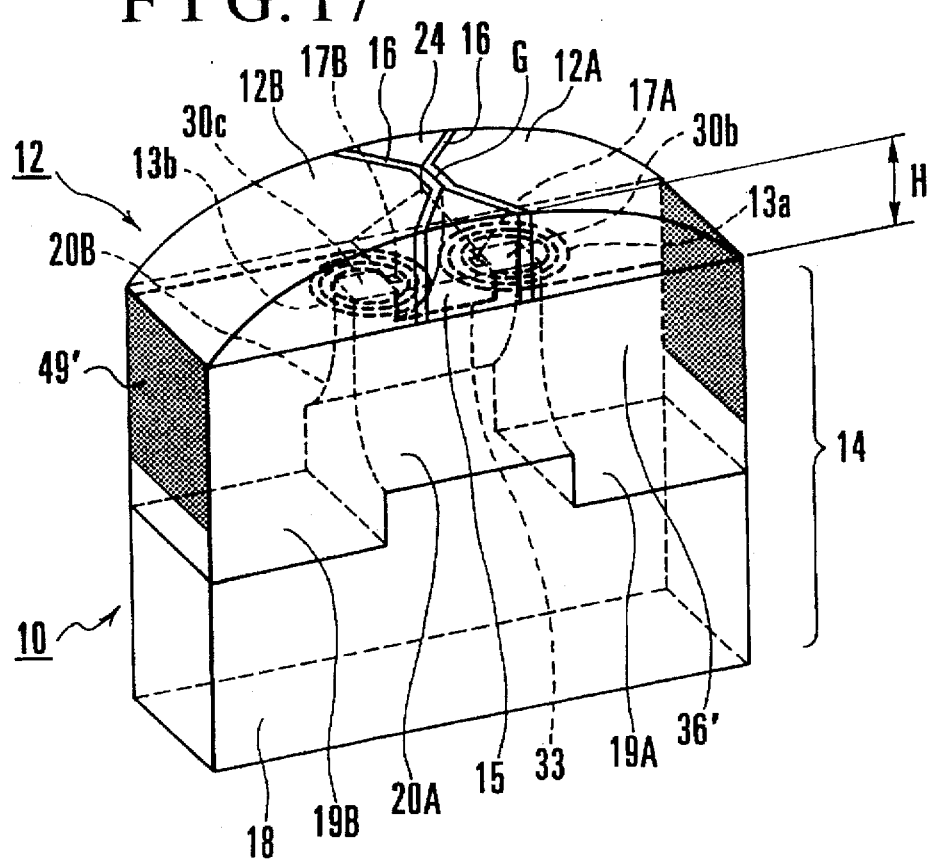
FIG. 17 is an oblique view showing a magnetic head arranged as a third embodiment of this invention.

FIG. 17 shows in an oblique view the arrangement of a magnetic head 10 which is the third embodiment.

In the magnetic head 10, the thin film coil parts 13a and 13b are interconnected by providing the conductive film 33 on the inner side of the winding groove 15. The thin film coil parts 13a and 13b are connected directly to the conductive film 33 at coil connecting points 17A and 17B, respectively.

The details of how the thin film coil parts 13a and 13b are connected to the conductive film 33 will become apparent from the description of manufacturing processes which will be given later herein. To put it briefly, however, the connection is automatically made when the thin film coil parts 13a and 13b are formed on the lower core 14. The magnetic head 10 can be simply formed by arranging the thin film coil parts 13a and 13b in one layer. The terminals of the thin film coil parts 13a and 13b are drawn out along the connection face of the upper core 12 and are connected to conductive films 49' which are formed on the exposed surface of glass 36' provided on the lower core 14.

The method for manufacturing the lower core 14 is next described with reference to FIGS. 18(a) to 18(k).

Figure 18A:
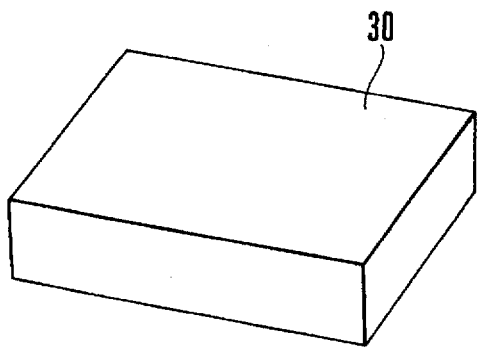
FIGS. 18(a) to 18(k) show processes to be carried out in manufacturing the lower core of the magnetic head shown in FIG. 17.

Referring first to FIG. 18(a), the surface of a ferrite plate 30 which is a ferromagnetic oxide material is ground.

Figure 18B:
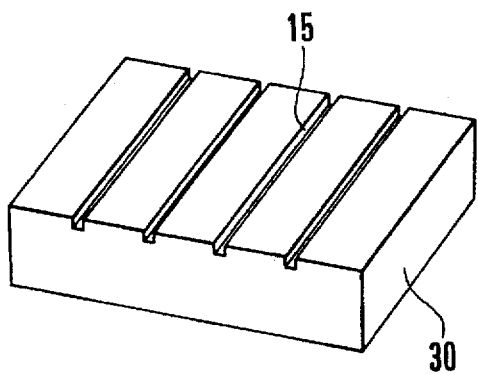

Referring to FIG. 18(b), a plurality of winding grooves 15 which are to be used for forming the thin film coil parts 13a and 13b on the lower core 14 are formed in parallel in the ferrite plate 30 by grinding. The depth of the winding grooves 15 preferably does not exceed 50 μm, because the magnetic path would be expanded if the depth of the winding grooves 15 is too deep.

Figure 18D:
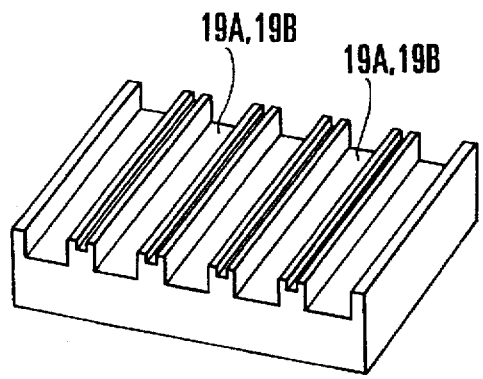
Figure 18C:
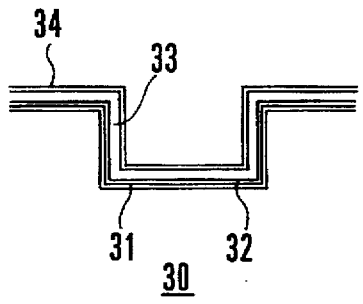

After that, as shown in a sectional view in FIG. 18(c), an insulating film 31 which is made of $SiO_2$, $Cr_2O_3$, $TiO_2$ or the like is formed on the surface of the plate 30 by a vacuum film forming method. Then, a prime coat film 32 which is made of Cr or the like is formed on the insulating film 31 for the purpose of allowing the conductive film 33 which is a next layer to be adequately laminated. The conductive film 33 is made of Cu, Ni, Au or the like and is formed on the prime coat film 32 by plating. The conductive film 33 is provided to connect the thin film coil parts 13a and 13b which are to be formed at two adjacent parts as shown in FIG. 17. The thickness of the conductive film 33 is, therefore, preferably set at such a thickness that gives a resistance value not exceeding 1Ω. After plating, to prevent the conductive film 33 from oxidizing, a protection film 34 is formed on the surface of the conductive film 33 with $SiO_2$, $Cr_2O_3$, $TiO_2$ or the like by a vacuum film forming method. In this case, the conductive film 33 is formed by plating as it is necessary to form the conductive film 33 at a thickness of 5 to 10 μm and also it is desired to shorten the length of time required for film forming. However, the conductive film 33 may be formed by sputtering or a vacuum film forming method instead of plating.

In the next process, as shown in FIG. 18(d), a plurality of width restricting grooves 19A and 19B for restricting the width of the magnetic path in the lower core 14 are formed. However, in machining, these grooves 19A and 19B are formed as one groove by grinding.

Figure 18E:
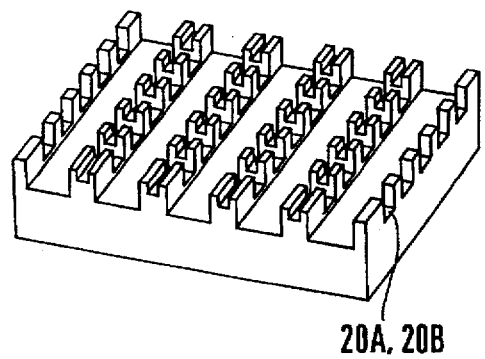

Further, as shown in FIG. 18(e), a plurality of thickness restricting grooves 20A and 20B for restricting the thickness of the magnetic path are formed in parallel and in the direction of orthogonally intersecting the width restricting grooves 19A and 19B. The thickness restricting grooves 20A and 20B have a difference in level from the width restricting grooves 19A and 19B. In machining, the grooves 20A and 20B are formed as one groove by grinding.

In a case where the magnetic gap G has an azimuth angle θ, the restricting grooves 20A and 20B are formed by slanting them as much as the azimuth angle θ unlike in the above-stated case. In other words, as shown in FIGS. 19(a) and 19(b), the restricting grooves 20A and 20B are formed by slanting them as much as α (=90°−θ) with respect to the restricting grooves 19A and 19B. The reason for forming the restricting grooves 20A and 20B to be aslant as much as the azimuth angle θ in a case where the magnetic gap G has an azimuth angle θ is as follows. With the thickness of the core assumed to be T in a case where the magnetic gap G has no azimuth angle as shown in FIG. 19(c), if the magnetic gap G has a large azimuth angle as shown in FIG. 19(c), the thin film coil 13 might be cut in part when the core is cut at the core thickness T. In such a case, it becomes impossible to obtain a desired characteristic or to completely insulate the thin film coil 13. In the event of a magnetic gap G having a large azimuth angle, therefore, the restricting grooves 20A and 20B are formed aslant as much as the azimuth angle θ. With the restricting grooves 20A and 20B formed aslant in this manner, the core can be cut to have a predetermined core thickness T without cutting the thin film coil 13, although joining parts 30b and 30c are formed then in a parallelogramic shape as shown in FIG. 19(e).

Figure 18F:
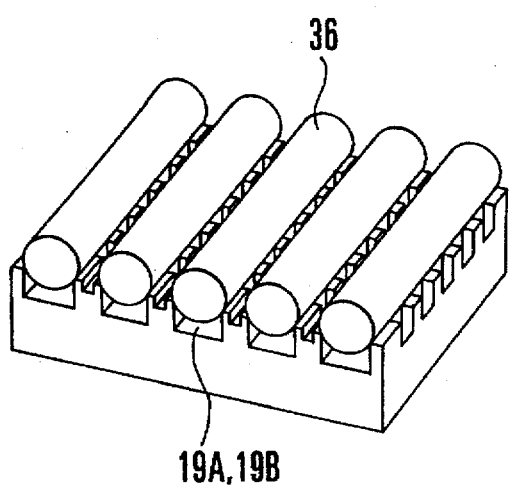

Referring to FIG. 18(f), glass bars 36 are set on the machined grooves 19A and 19B and heated to bury the glass into all the machined grooves 19A, 19B, 20A and 20B. Considering a subsequent process of joining the upper core 12, the glass bars 36 to be used here are preferably made of a high melting point glass material.

Figure 18G:
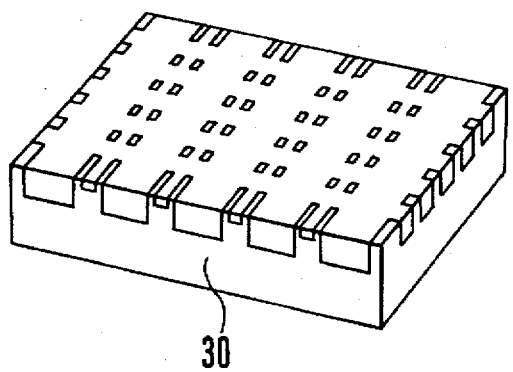

Next, as shown in FIG. 18(g), unnecessary parts of glass on the surface of the plate 30 are removed by surface grinding. As a result, two magnetic path connecting parts 30b and 30c and the conductive film 33 come to be exposed in a state as shown in FIG. 18(h).

Figure 18H:
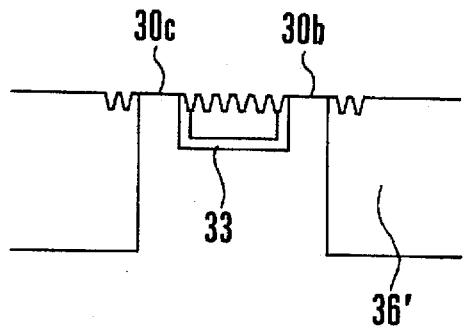

To form the thin film coil parts 13a and 13b (see FIG. 17), as shown in FIGS. 18(h) and 19(f), a photoresist is applied to the surface of the glass 36'. After the pattern (FIG. 19(f)) of the thin film coil parts 13a and 13b is exposed to light, the photoresist is removed. Further, the exposed part is subjected to ion milling to form coil-pattern recessed parts 37A and 37B in a helical shape on the glass surface. The depth of the recessed parts is about 4 to 5 μm. The pattern of the thin film coil parts 13a and 13b is in a shape of balanced windings encompassing the two magnetic path connecting parts 30b and 30c which are exposed on the surface. The end parts 37a and 37b of the recessed parts 37A and 37B are overlapping the exposed parts of the conductive film 33. By virtue of this arrangement, the thin film coil 13 is automatically connected to the conductive film 33 when the thin film coil 13 is formed in the recessed parts 37A and 37B.

Figure 18I:
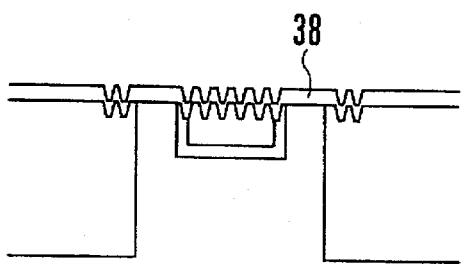

Next, as shown in FIG. 18(i), a film is formed by plating in such a way as to have a metal film 38 which excels in electric conductivity, such as Cu, Au or the like, buried in the helical recessed parts 37A and 37B to a thickness of about 6 μm. The film forming process may be carried out by a vacuum thin-film forming method, also in this case, instead of plating.

Figure 18J:
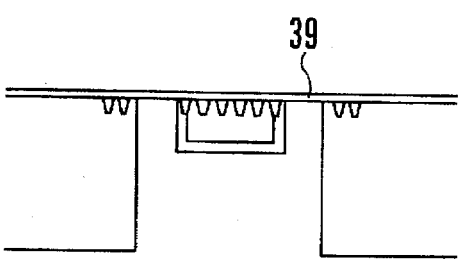

Then, as shown in FIGS. 18(j) and 19(g), the metal film 38 is removed by grinding. After that, an insulating film 39 is formed with a material such as $SiO_2$, $Cr_2O_3$ or the like to a thickness not exceeding 1 μm. The insulating film 39 is formed to have the thickness not exceeding 1 μm the purpose of preventing the film 39 from affecting the magnetic characteristic of the magnetic head 10 after the magnetic head 10 is formed by joining the upper and lower cores 12 and 14 together. The pattern of the thin film coil parts 13a and 13b is formed as shown in FIG. 19(g) by the sequence of manufacturing processes described above. The adjacent thin film coil parts 13a and 13b can be easily connected to the conductive film 33 through the coil connecting points 17A and 17B.

Figure 18K:
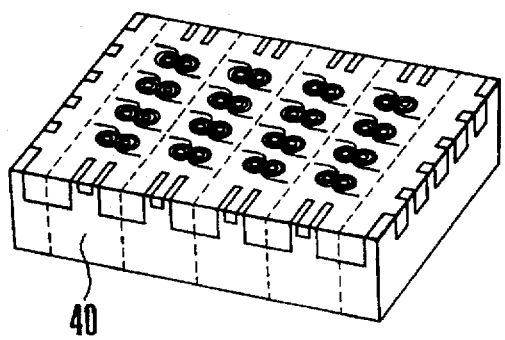

Then, a block 40 for the lower core 14 is obtained by cutting the plate 30 along broken lines shown in FIG. 18(k).

The block 46 for the upper core 12 obtained by the machining processes shown in FIGS. 7(a) to 7(f) and the block 40 for the lower core 14 are processed as shown in FIGS. 8(a) and 8(b) to obtain the magnetic head 10 which is the third embodiment of this invention.

The arrangement of the third embodiment also permits one to obtain a magnetic head which has a magnetic path compactly arranged to give a good C/N characteristic.

The characteristics of the magnetic head 10 which is obtained as described above are compared with those of the conventional MIG type magnetic head mentioned in the foregoing description of the prior art. Data obtained as the results of the comparison is as shown in Table 3 below. The mechanical characteristics of these heads are obtained by setting the track width at 14 μm, the gap width at 0.2 μm and the gap depth at 12 μm in the same manner as in the case of the first embodiment. "Sendust" is used for both the magnetic films 16 and 512 of the heads. Outputs are measured by using a vapor evaporation tape of a coercive force of 1600 [Oe] as a recording medium. The relative speed of the recording medium is set at 10.2 m/s and the frequency at 21 MHz.

TABLE 3

|  | inductance (20 MHz) | number of turns | DC resistance | 21 MHz C/N |
|---|---|---|---|---|
| Prior art head: | 0.48 μH | 14 T | 0.9 Ω | 52.0 dB |
| Embodiment: | 0.44 μH | 20 T | 5.5 Ω | 54.6 dB |

For obtaining about the same inductance of 0.45 μH, the number of turns of the embodiment can be increased by 6 turns from the 14 turns of the conventional magnetic head. The embodiment thus evidently has a lower inductance. Although the DC resistance increases due to the use of the thin film coil, this increase causes almost no adverse effect and the C/N characteristic is improved by 2.6 dB. The results of comparison clearly indicate the advantage of the use of the thin film coil and the reduction in size of the magnetic path in the lower core, as the sliding parts of the two are of about the same structural arrangement.

Figure 20A:
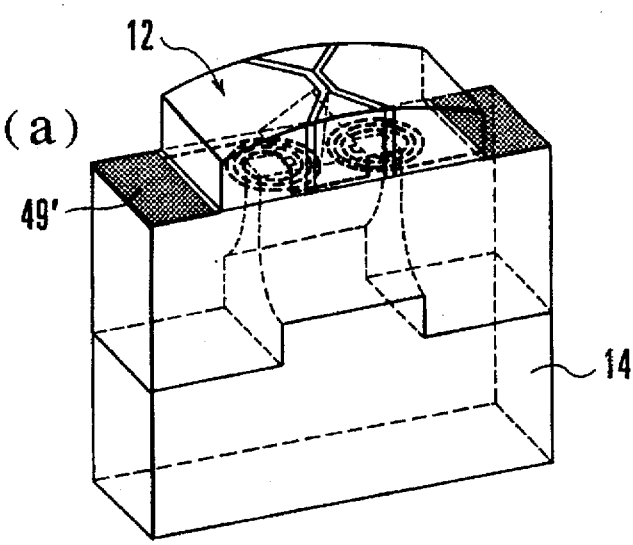
FIGS. 20(a) to 20(c) respectively show by way of example modifications of the third embodiment.
Figure 20B:
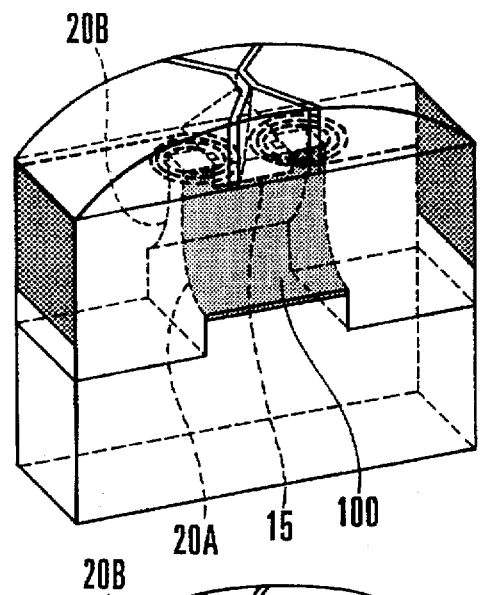
Figure 20C:
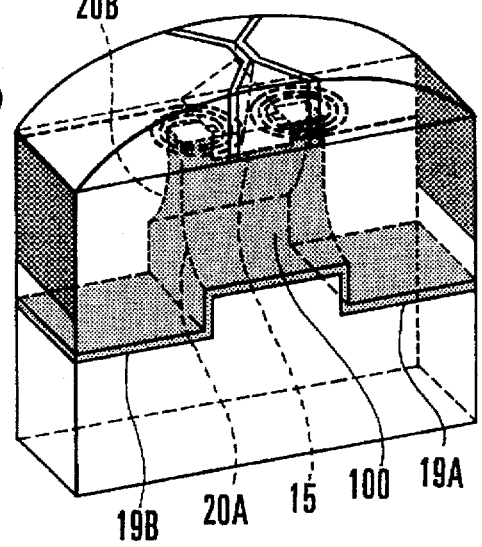

FIGS. 20(a), 20(b) and 20(c) show modifications of the third embodiment described above. FIG. 20(a) shows a modification in which the length of the upper core 12 in the traveling direction of a recording medium is arranged to be shorter than the length of the lower core 14. This arrangement permits to arrange the terminals 49' of the thin film coil 13 on the joining face of the lower core 14 to the upper core 12.

FIG. 20(b) shows another modification in which a conductive film 100 is disposed at the restricting grooves 20A and 20B. In the case of the modification shown in FIG. 20(c), the conductive film 100 is disposed at the restricting grooves 19A, 19B, 20A and 20B.

According to the arrangement of each of these modifications, the whole magnetic path of the magnetic head 10 also can be compactly arranged by arranging the upper core 12 to be thin and by reducing the length and the sectional area of the magnetic path of the lower core 14, in the same manner as each of the embodiments described.

Further, with the conductive film 33 arranged to be formed within the winding groove 15 beforehand, the thin film coil parts 13a and 13b formed respectively at the magnetic path connecting parts 30b and 30c can be connected to each other through the conductive film 33 when the thin film coil parts 13a and 13b are formed. The embodiment described above, therefore, excels in productivity.

What is claimed is:

1. A magnetic head comprising:
   a) a first core having magnetic materials joined together through a magnetic gap;
   b) a second core having a magnetic material; and
   c) a coil formed with a thin film circumscribing a part of said head which magnetically connects said first core and said second core.

2. A magnetic head according to claim 1, wherein said second core defines first restricting grooves and second restricting grooves which are formed in a state of intersecting the first restricting grooves.

3. A magnetic head according to claim 2, wherein a conductive film is disposed in the first restricting grooves.

4. A magnetic head according to claim 3, wherein a part of said conductive film is connected to a part of said coil.

5. A magnetic head according to claim 4, wherein a part of said conductive film is exposed on one side face of said magnetic head.

6. A magnetic head according to claim 4, wherein a part of said conductive film is exposed on a bottom face of said magnetic head.

7. A magnetic head according to claim 2, wherein portions of said second core which are removed in forming the first and second restricting grooves are filled with glass.

8. A magnetic head according to claim 7, wherein said coil is disposed on a joining face of said glass at which said second core is joined to said first core.

9. A magnetic head according to claim 1, wherein said first core comprises first and second core halves and a gap therebetween, and wherein said first and second core halves are joined to each other over respective plural surface portions thereof.

10. A magnetic head according to claim 9, wherein an area of one of said surface portions does not exceed $1\times10^{-2}$ mm$^2$.

11. A magnetic head according to claim 1, wherein the magnetic material of said second core is composed of a high-saturation magnetic-flux-density metal magnetic film which is formed in a groove of a nonmagnetic substrate to have a recessed sectional shape.

12. A magnetic head according to claim 11, wherein said recessed sectional shape is a V shape.

13. A magnetic head according to claim 1, wherein said part of said head which magnetically connects said first core and said second core is formed in two portions across a recessed part of said head, wherein two coils formed with a thin film discretely circumscribe said two portions, and wherein said discretely disposed coils are interconnected by a conductive film disposed in said recessed part.

14. A magnetic head comprising:
 a) a first core composed of a magnetic material having a magnetic gap;
 b) a second core having a magnetic material, the magnetic material of said second core being composed of a high-saturation magnetic-flux-density metal magnetic film formed in an approximately V-like sectional shape on a groove of a nonmagnetic substrate; and
 c) a thin film coil formed with a conductive metal film circumscribing a magnetic path connecting part between said magnetic film and said first core.

15. A magnetic head according to claim 14, wherein the magnetic path connecting part of said magnetic film for connection with said first core has the width of a magnetic path thereof restricted by a pair of first restricting grooves formed in said nonmagnetic substrate and has the thickness of the magnetic path restricted by a pair of second restricting grooves formed in said nonmagnetic substrate in a shape of intersecting the first restricting grooves.

16. A magnetic head according to claim 15, wherein end parts of said thin film coil are connected to conductive films formed on inner sides of the first restricting grooves of said nonmagnetic substrate and are connected to outside parts through said conductive films.

17. A magnetic head according to claim 14, wherein an angle of inclination of said magnetic film of the approximately V-like sectional shape with respect to a magnetic path connecting face provided for connection with said first core is within a range from 20° to 60° in the vicinity of the magnetic path connecting face.

18. A magnetic head according to claim 14, wherein said magnetic film is laminated into a plurality of layers through an intermediate insulating film.

19. A magnetic head according to claim 14, wherein said magnetic film has two magnetic path connecting faces for magnetic connection with said first core, and wherein an area of each of said two magnetic path connecting faces does not exceed $1\times10^{-2}$ mm$^2$.

20. A magnetic head according to claim 14, wherein said thin film coil is formed in a balanced winding structure including two coils wound respectively around two magnetic path connecting faces provided for connection of said first core and said magnetic film.

21. A magnetic head according to claim 14, wherein the thickness of said first core does not exceed 0.2 mm.

22. A magnetic head comprising:
 a) a first core having magnetic materials joined together through a magnetic gap;
 b) a second core having a magnetic material, said second core having two magnetic connecting parts formed across a recessed part to be joined to said first core and;
 c) coils discretely formed with a thin film respectively around said two magnetic connecting parts;
 d) a conductive film arranged in said recessed part to interconnect said discrete coils.

23. A magnetic head according to claim 22, wherein said second core defines first restricting grooves and second restricting grooves which are formed in a state of intersecting the first restricting grooves.

24. A magnetic head according to claim 23, wherein portions of said second core which are removed in forming the first and second restricting grooves are filled with glass.

25. A magnetic head according to claim 24, wherein each of said coils is disposed on a joining face of said glass at which said second core is joined to said first core.

26. A magnetic head according to claim 25, wherein terminals of said coils are formed on exposed faces of said glass.

27. A magnetic head according to claim 26, wherein said first core comprises first and second core halves and a gap therebetween, and wherein said two magnetic connecting parts are connected respectively to said first core half and said second core half.

28. A magnetic head according to claim 27, wherein an area of one of said magnetic connecting parts does not exceed $1\times10^{-2}$ mm$^2$.

* * * * *

UNITED STATES PATENT AND TRADEMARK OFFICE
CERTIFICATE OF CORRECTION

PATENT NO. : 5,684,659
DATED : November 4, 1997
INVENTOR(S) : Kawase et al.

It is certified that error appears in the above-identified patent and that said Letters Patent is hereby corrected as shown below:

Col. 10, line 44, delete "FIG. 14(c)." and insert -- FIG. 14(d). --.

Col. 14, line 58, delete "FIG. 19(c)," and insert -- FIG. 19(d), --.

Signed and Sealed this

Fourteenth Day of April, 1998

Attest:

BRUCE LEHMAN

*Attesting Officer*     *Commissioner of Patents and Trademarks*